US012659479B2

(12) United States Patent
Zhao et al.

(10) Patent No.: US 12,659,479 B2
(45) **Date of Patent: \*Jun. 16, 2026**

(54) LUMA AND CHROMA BLOCK PARTITIONING

(71) Applicant: Huawei Technologies Co., Ltd., Shenzhen (CN)

(72) Inventors: Yin Zhao, Shenzhen (CN); Haitao Yang, Shenzhen (CN); Jianle Chen, San Diego, CA (US); Jiali Fu, Shenzhen (CN)

(73) Assignee: Huawei Technologies Co., Ltd., Shenzhen (CN)

( \* ) Notice: Subject to any disclaimer, the term of this patent is extended or adjusted under 35 U.S.C. 154(b) by 0 days.

This patent is subject to a terminal disclaimer.

(21) Appl. No.: 17/394,225

(22) Filed: Aug. 4, 2021

(65) Prior Publication Data

US 2021/0368174 A1 Nov. 25, 2021

Related U.S. Application Data

(63) Continuation of application No. 17/072,865, filed on Oct. 16, 2020, now Pat. No. 11,109,026, which is a
(Continued)

(51) Int. Cl.
*H04N 19/119* (2014.01)
*H04N 19/132* (2014.01)
(Continued)

(52) U.S. Cl.
CPC ......... *H04N 19/119* (2014.11); *H04N 19/132* (2014.11); *H04N 19/159* (2014.11);
(Continued)

(58) Field of Classification Search
CPC .. H04N 19/119; H04N 19/132; H04N 19/159; H04N 19/186; H04N 19/1883;
(Continued)

(56) References Cited

U.S. PATENT DOCUMENTS 9,462,275 B2 10/2016 Guo et al.
2017/0272750 A1* 9/2017 An ........................ H04N 19/119
(Continued)

FOREIGN PATENT DOCUMENTS

JP 2020506593 A 2/2020
JP 2021523590 A 9/2021
(Continued)

OTHER PUBLICATIONS

Bross et al. ("Versatile Video Coding (Draft 2)", JVET-K1001-v1, Jul. 27, 2018) . (Year: 2018).*
(Continued)

*Primary Examiner* — Matthew K Kwan
(74) *Attorney, Agent, or Firm* — Conley Rose, P.C.

(57) ABSTRACT

A video coding mechanism is disclosed. The mechanism includes obtaining a coding tree unit including luma samples and chroma samples. The mechanism partitions the luma samples and the chroma samples according to a common coding tree when a size of a first coding tree node exceeds a threshold. The mechanism also partitions the luma samples with a luma coding sub-tree when a size of a second coding tree node is equal to or less than the threshold. The mechanism also chroma samples with a chroma coding sub-tree when a size of a third coding tree node is equal to or less than the threshold. The luma coding sub-tree contains a different set of split modes than the chroma coding sub-tree.

19 Claims, 11 Drawing Sheets

Related U.S. Application Data continuation of application No. PCT/US2019/020740, filed on Mar. 5, 2019.

(60) Provisional application No. 62/732,675, filed on Sep. 18, 2018, provisional application No. 62/660,121, filed on Apr. 19, 2018.

(51) Int. Cl.

| | |
|---|---|
| *H04N 19/159* | (2014.01) |
| *H04N 19/169* | (2014.01) |
| *H04N 19/186* | (2014.01) |
| *H04N 19/46* | (2014.01) |
| *H04N 19/96* | (2014.01) |

(52) U.S. Cl.
CPC ....... *H04N 19/186* (2014.11); *H04N 19/1883* (2014.11); *H04N 19/46* (2014.11); *H04N 19/96* (2014.11)

(58) Field of Classification Search
CPC ........ H04N 19/46; H04N 19/96; H04N 19/70; H04N 19/593
USPC ...................................................... 375/240.02
See application file for complete search history.

(56) References Cited

U.S. PATENT DOCUMENTS

| | | |
|---|---|---|
| 2017/0347096 A1 | 11/2017 | Hong et al. |
| 2017/0347102 A1 | 11/2017 | Panusopone et al. |
| 2018/0205946 A1 | 7/2018 | Zhang et al. |
| 2021/0037242 A1 | 2/2021 | Zhao et al. |
| 2021/0289221 A1* | 9/2021 | Misra ................... H04N 19/124 |

FOREIGN PATENT DOCUMENTS

| | | | |
|---|---|---|---|
| KR | 20170077203 A | 7/2017 | |
| WO | 2016074147 A1 | 5/2016 | |
| WO | 2017137311 A1 | 8/2017 | |
| WO | 2017203930 A1 | 11/2017 | |
| WO | 2017205704 A1 | 11/2017 | |
| WO | 2018142823 A1 | 8/2018 | |

OTHER PUBLICATIONS

Document: JVET-D0117r1, "Multi-Type-Tree," Joint Video Exploration Team (JVET) of ITU-T SG 16 WP 3 and ISO/IEC JTC 1/SC 29/WG 11, 4th Meeting: Chengdu, CN, Oct. 15-21, 2016, 3 pages.

Chen, et al., "JVET-G1001—Algorithm Description of Joint Exploration Test Model 7 (JEM7)," 7th Meeting: Torino, IT, JVET-G0001v1, Jul. 13-21, 2017, 51 pages.

"NextSoftware: an Alternative Implementation of the Joint Exploration Model (JEM): NextSoftware: an alternative implementation of the Joint Model (JEM)," JVET-H0084-V4, Dec. 6, 2017, 12 pages.

Urban, F., et al., "Decoupled Luma/Chroma Transform Trees for Intra," 3rd Meeting: Geneva, CH, JVET-C0039, May 26-Jun. 1, 2016, 2 pages.

Chuang, et al., "CE1-related: Separate tree partitioning at 64×64-luma/32×32-chroma unit level," 11th Meeting: Ljubljana, SI, Jul. 10-18, 2018, JVET-K0230-v3, 14 pages.

Bross, et al., "Versatile Video Coding (Draft 2)," 11th Meeting: Ljubljana, SI, Jul. 10-18, 2018, JVET-K1001v1, Jul. 27, 2018, 43 pages.

"Series H: Audiovisual and Multimedia System Infrastructure of audiovisual services—Coding of moving video, High efficiency video coding," H.265, Apr. 2013, 317 pages.

Document: JVET-J0024-v2, Akula, S., et al., "Description of SDR and HDR and 360" video coding technology proposal considering mobile application scenario by Samsung, Huawei, GoPro, and HiSilicon," Joint Video Exploration Team (JVET) of ITU-TSG 16 WP 3 and ISO/IEC JTC 1/SC 29/WG 11, 10th Meeting: San Diego, US, Apr. 2018, 8 pages.

* cited by examiner

200

211

300

Encoder

400

Decoder

Bitstream

Entropy
Decoding

433

429

Inverse
Transform &
Quantization

421

Motion
Compensation

417

Intra-Picture
Prediction

423

Decoded
Picture Buffer

425

In-loop Filters

Output
Video
Signal

600

611

613

615

615

615

615

617

614

619

800

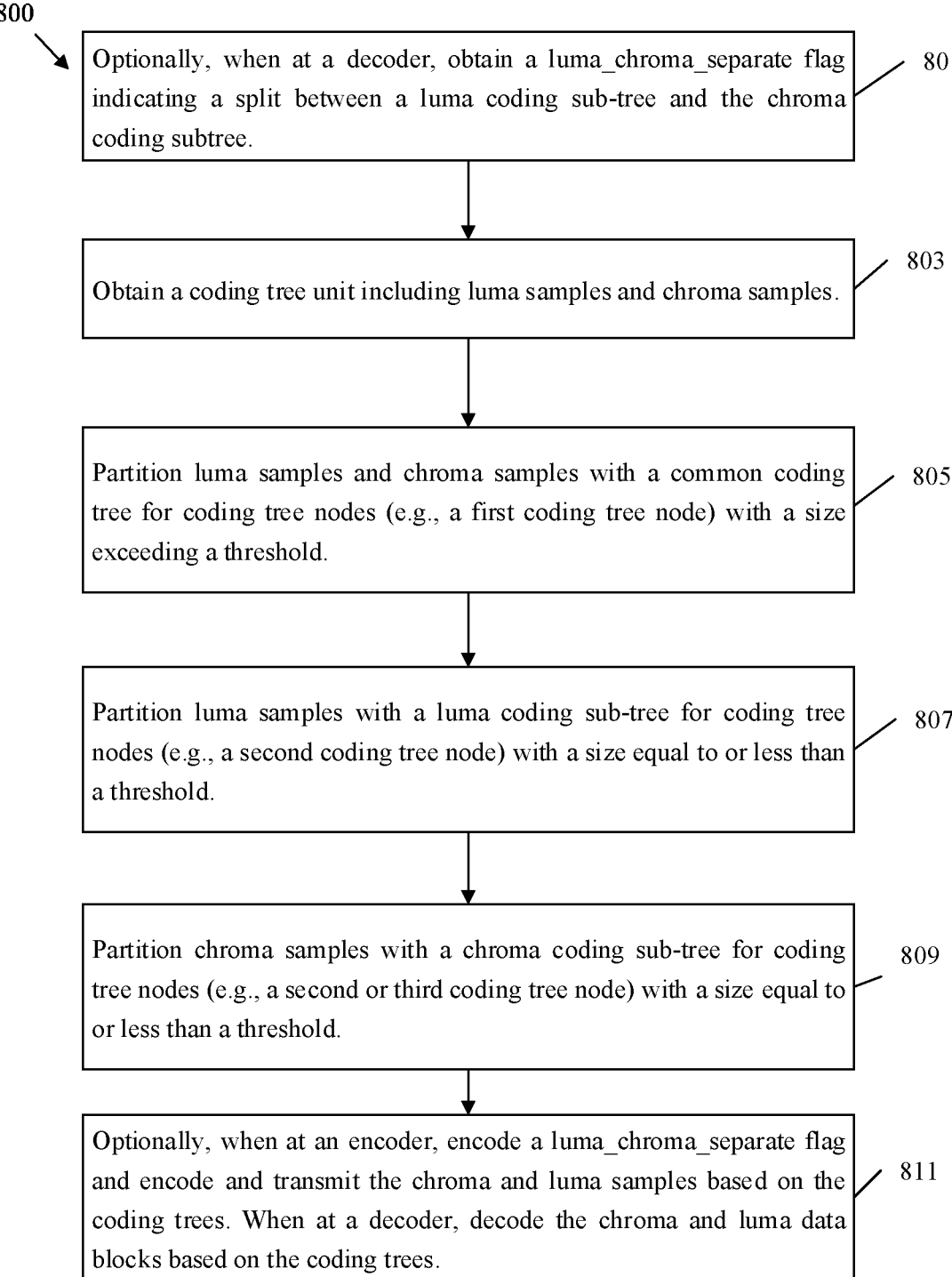

Optionally, when at a decoder, obtain a luma_chroma_separate flag indicating a split between a luma coding sub-tree and the chroma coding subtree.                    801

Obtain a coding tree unit including luma samples and chroma samples.                    803

Partition luma samples and chroma samples with a common coding tree for coding tree nodes (e.g., a first coding tree node) with a size exceeding a threshold.                    805

Partition luma samples with a luma coding sub-tree for coding tree nodes (e.g., a second coding tree node) with a size equal to or less than a threshold.                    807

Partition chroma samples with a chroma coding sub-tree for coding tree nodes (e.g., a second or third coding tree node) with a size equal to or less than a threshold.                    809

Optionally, when at an encoder, encode a luma_chroma_separate flag and encode and transmit the chroma and luma samples based on the coding trees. When at a decoder, decode the chroma and luma data blocks based on the coding trees.                    811

FIG. 8

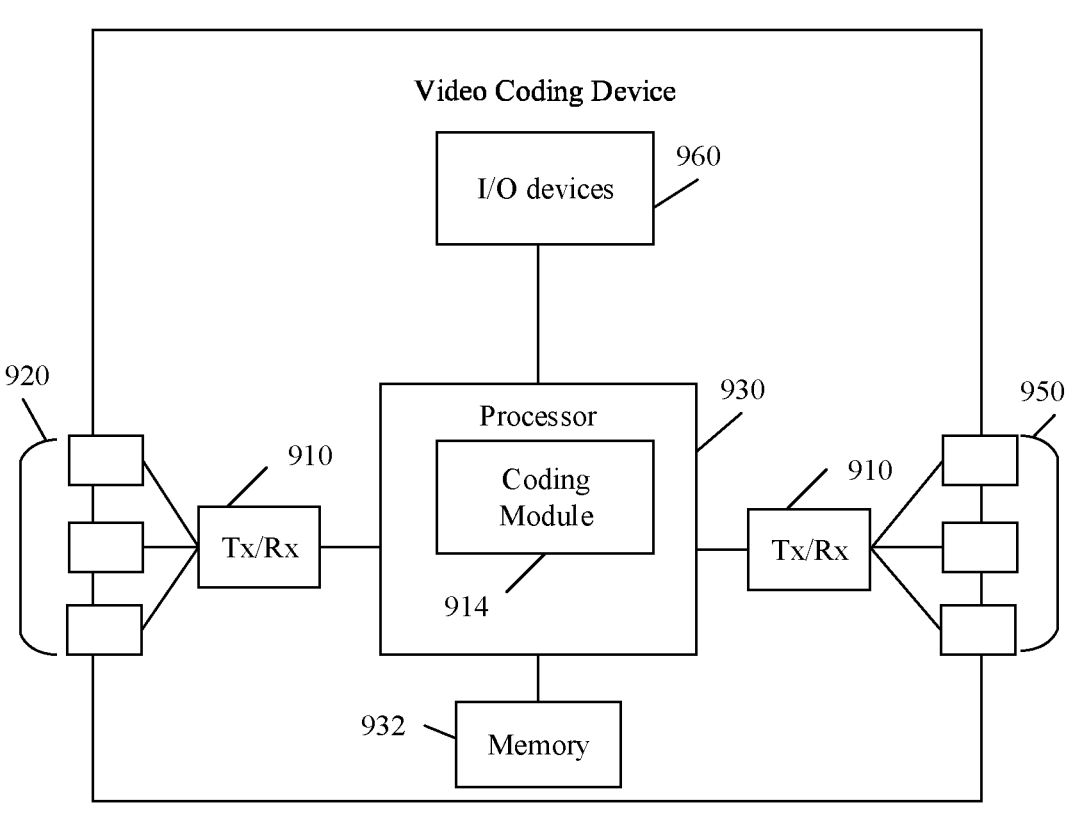
FIG. 9

1100

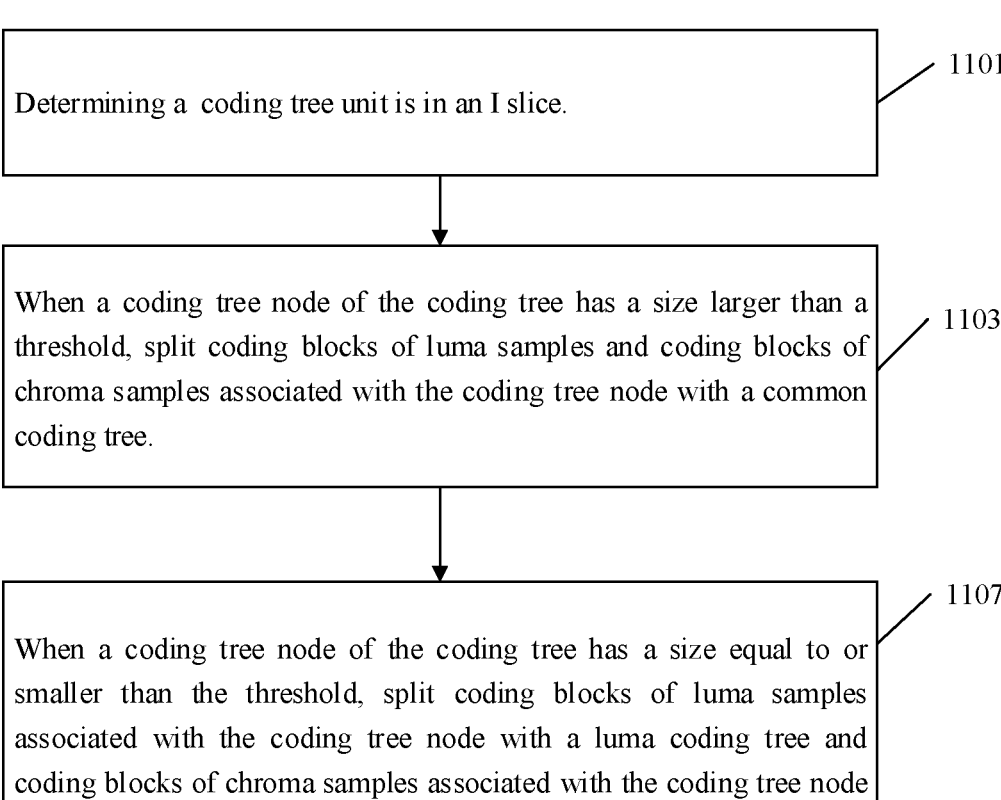

Determining a coding tree unit is in an I slice.     1101

When a coding tree node of the coding tree has a size larger than a threshold, split coding blocks of luma samples and coding blocks of chroma samples associated with the coding tree node with a common coding tree.     1103

When a coding tree node of the coding tree has a size equal to or smaller than the threshold, split coding blocks of luma samples associated with the coding tree node with a luma coding tree and coding blocks of chroma samples associated with the coding tree node according to a chroma coding tree.     1107

FIG. 11

LUMA AND CHROMA BLOCK PARTITIONING

CROSS-REFERENCE TO RELATED APPLICATIONS

This patent application is a continuation of U.S. patent application Ser. No. 17/072,865 filed on Oct. 16, 2020 by Huawei Technologies Co., Ltd., and titled "Luma and Chroma Block Partitioning," which is a continuation of International Application No. PCT/US2019/020740 filed on Mar. 5, 2019, by Futurewei Technologies, Inc., and titled "Luma and Chroma Block Partitioning," which claims the benefit of U.S. Provisional Patent Application No. 62/660,121, filed Apr. 19, 2018 by Yin Zhao, et. al., and titled "Separate Luma and Chroma Block Partitioning For Video Coding," and U.S. Provisional Patent Application No. 62/732,675, filed Sep. 18, 2018 by Yin Zhao, et. al., and titled "Partition Method, And Device," each of which is hereby incorporated by reference.

TECHNICAL FIELD

The present disclosure is generally related to video coding, and is specifically related to generating coding trees for partitioning luma and chroma coding blocks in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a video coding device. The method comprises obtaining, by a processor of the video coding device, a coding tree unit including a coding tree node. The method further comprises partitioning, by the processor, luma samples and chroma samples in a first coding tree node of the coding tree unit according to a common coding tree when a size of the first coding tree node exceeds a threshold. The method further comprises partitioning, by the processor, the luma samples in a second coding tree node of the coding tree unit with a luma coding sub-tree when a size of the second coding tree node is equal to or less than the threshold. The method further comprises partitioning, by the processor, the chroma samples in the second coding tree node of the coding tree unit with a chroma coding sub-tree when the size of a second coding tree node is equal to or less than the threshold. In this embodiment, the same coding tree is used for both luma and chroma samples for larger blocks (e.g., above a threshold) while splitting into different coding trees (e.g., sub-trees) for smaller blocks (e.g., less than or equal to the threshold). Separate trees allow for different partitioning for luma and chroma samples, and hence can be tailored to increase overall coding efficiency. However, using separate trees instead of a single tree takes more processing resources and results in the usage of more memory space in the final encoding. Splitting a common coding tree into different sub-trees below a threshold allows the overall tree from the luma block to be reused for most of the chroma block (e.g., reducing complexity and memory usage) while tailoring the sub-trees for smaller luma and chroma blocks (e.g., increasing coding efficiency).

Optionally, in any of the preceding aspects, another implementation of the aspect provides, wherein the threshold is four thousand ninety-six pixels or six in log domain with 2 as the base.

Optionally, in any of the preceding aspects, another implementation of the aspect provides, wherein the coding tree unit is in an Intra-prediction (I) frame.

Optionally, in any of the preceding aspects, another implementation of the aspect provides, wherein chroma samples include blue difference chroma (Cb) samples and red difference chroma (Cr) samples, and wherein the Cb samples and Cr samples are partitioned by a common chroma coding sub-tree.

Optionally, in any of the preceding aspects, another implementation of the aspect provides, wherein the video coding device is an encoder. The method further comprises encoding in a bitstream a luma_chroma_separate flag to indicate a split between the luma coding sub-tree and the chroma coding sub-tree. The luma_chroma_separate flag provides a mechanism of indicating to the decoder that different luma and chroma coding sub-trees are in use.

Optionally, in any of the preceding aspects, another implementation of the aspect provides, wherein the video coding device is a decoder. The method further comprises receiving a luma_chroma_separate flag from a bitstream. The luma_chroma_separate flag indicates a split between the luma coding sub-tree and the chroma coding sub-tree. The luma samples and chroma samples are partitioned by separate coding sub-trees based on a value of the luma_chroma_separate flag. The luma_chroma_separate flag provides a mechanism of indicating to the decoder that different luma and chroma coding sub-trees are in use.

In an embodiment, the disclosure includes a video encoder comprising a processor configured to obtain a coding tree unit including a coding tree node. The processor is also configured to partition the luma samples and the chroma samples in a first coding tree node of the coding tree unit according to a common coding tree when a size of the first coding tree node exceeds a threshold. The processor is also configured to partition the luma samples in a second coding tree node of the coding tree unit with a luma coding sub-tree when a size of the second coding tree node is equal to or less than the threshold. The processor is also configured to partition the chroma samples in the second coding tree node of the coding tree unit with a chroma coding sub-tree when the size of a second coding tree node is equal to or less than the threshold. The processor is also configured to encode the chroma samples and the luma samples into a bitstream based on the common coding tree, the luma coding sub-tree, and the chroma coding sub-tree. The video encoder also includes a transmitter coupled to the processor. The transmitter is configured to transmit the bitstream to support reconstruction of the chroma samples and the luma samples for display by a video decoder. In this embodiment, the same coding tree is used for both luma and chroma samples for larger blocks (e.g., above a threshold) while splitting into different coding trees (e.g., sub-trees) for smaller blocks (e.g., less than or equal to the threshold). Separate trees allow for different partitioning for luma and chroma samples, and hence can be tailored to increase overall coding efficiency. However, using separate trees instead of a single tree takes more processing resources and results in the usage of more memory space in the final encoding. Splitting a common coding tree into different sub-trees below a threshold allows the overall tree from the luma to be reused for most of the chroma (e.g., reducing complexity and memory usage) while tailoring the sub-trees for smaller luma and chroma blocks (e.g., increasing coding efficiency).

Optionally, in any of the preceding aspects, another implementation of the aspect provides, wherein the threshold is four thousand ninety-six pixels or six in log domain with 2 as the base.

Optionally, in any of the preceding aspects, another implementation of the aspect provides, wherein the coding tree unit is in an I frame.

Optionally, in any of the preceding aspects, another implementation of the aspect provides, wherein chroma samples include Cb samples and Cr samples, and wherein the Cb samples and Cr samples are partitioned by a common chroma coding sub-tree.

Optionally, in any of the preceding aspects, another implementation of the aspect provides, wherein the processor is further configured to encode a luma_chroma_separate flag in the bitstream to indicate a split between the luma coding sub-tree and the chroma coding sub-tree. The luma_chroma_separate flag provides a mechanism of indicating to the decoder that different luma and chroma coding sub-trees are in use.

In an embodiment, the disclosure includes a video decoder comprising a receiver to a receiver to receive a bitstream including a coding tree unit including luma data and chroma data. The video decoder further comprises a processor coupled to the receiver. The processor is configured to partition the luma data and the chroma data with a common coding tree when a size of a first coding tree node exceeds a threshold. The processor is further configured to partition the luma data with a luma coding sub-tree when a size of a second coding tree node is equal to or less than the threshold. The processor is further configured to partition the chroma data with a chroma coding sub-tree when a size of a third coding tree node is equal to or less than the threshold, wherein the luma coding sub-tree contains a different set of split modes than the chroma coding sub-tree. The processor is further configured to reconstruct the chroma data and the luma data into a slice of a video frame based on the common coding tree, the luma coding sub-tree, and the chroma coding sub-tree. The processor is further configured to forward the video frame toward a display. In this embodiment, the same coding tree is used for both luma and chroma samples for larger blocks (e.g., above a threshold) while splitting into different coding trees (e.g., sub-trees) for smaller blocks (e.g., less than or equal to the threshold). Separate trees allow for different partitioning for luma and chroma samples, and hence can be tailored to increase overall coding efficiency. However, using separate trees instead of a single tree takes more processing resources and results in the usage of more memory space in the final encoding. Splitting a common coding tree into different sub-trees below a threshold allows the overall tree from the luma to be reused for most of the chroma (e.g., reducing complexity and memory usage) while tailoring the sub-trees for smaller luma and chroma blocks (e.g., increasing coding efficiency).

Optionally, in any of the preceding aspects, another implementation of the aspect provides, wherein the threshold is four thousand ninety-six pixels or six in log domain with 2 as the base.

Optionally, in any of the preceding aspects, another implementation of the aspect provides, wherein luma data and chroma data are partitioned by different coding sub-trees when the coding tree unit is included in an I type slice in a video frame.

Optionally, in any of the preceding aspects, another implementation of the aspect provides, wherein chroma data includes Cb data and Cr data, and wherein the Cb data and Cr data are partitioned by a common chroma coding sub-tree.

Optionally, in any of the preceding aspects, another implementation of the aspect provides, wherein the processor is further configured to obtain a luma_chroma_separate flag from the bitstream, the luma_chroma_separate flag indicating a split between the luma coding sub-tree and the chroma coding sub-tree, and wherein the luma data and chroma data are partitioned by different coding sub-trees based on a value of the luma_chroma_separate flag. The luma_chroma_separate flag provides a mechanism of indicating to the decoder that different luma and chroma coding sub-trees are in use.

In an embodiment, the disclosure includes a non-transitory computer readable medium comprising a computer program product for use by a video coding device, the computer program product comprising computer executable instructions stored on the non-transitory computer readable medium such that when executed by a processor cause the video decoder to perform the method of any of the preceding aspects.

In an embodiment, the disclosure includes a video coding device comprising a fetching means for obtaining a coding tree unit including a coding tree node. The video coding device also includes a common tree partitioning means for partitioning luma samples and chroma samples in a first coding tree node of the coding tree unit according to a common coding tree when a size of the first coding tree node exceeds a threshold. The video coding device also includes a luma coding sub-tree partitioning means for partitioning the luma samples in a second coding tree node of the coding tree unit with a luma coding sub-tree when a size of the second coding tree node is equal to or less than the threshold. The video coding device also includes a chroma coding sub-tree partitioning means for partitioning the chroma samples in the second coding tree node of the coding tree unit with a chroma coding sub-tree when the size of a second coding tree node is equal to or less than the threshold. In this embodiment, the same coding tree is used for both luma and chroma samples for larger blocks (e.g., above a threshold) while splitting into different coding trees (e.g., sub-trees) for smaller blocks (e.g., less than or equal to the threshold). Separate trees allow for different partitioning for luma and chroma samples, and hence can be tailored to increase overall coding efficiency. However, using separate trees instead of a single tree takes more processing resources and results in the usage of more memory space in the final encoding. Splitting a common coding tree into different sub-trees below a threshold allows the overall tree from the luma to be reused for most of the chroma (e.g., reducing complexity and memory usage) while tailoring the sub-trees for smaller luma and chroma blocks (e.g., increasing coding efficiency).

Optionally, in any of the preceding aspects, another implementation of the aspect provides wherein the fetching means, the common tree partitioning means, the luma sub-tree partitioning means, and the chroma sub-tree partitioning means are further for performing the method of any of the preceding aspects.

In an embodiment, the disclosure includes a method comprising determining a coding tree unit is in an I frame. When a first coding tree node of a coding tree corresponding to the coding tree unit has a size larger than a threshold, splitting a coding block of luma samples and a coding block of chroma samples associated with the first coding tree node with a common coding tree. When a second coding tree node of the coding tree has a size equal to or smaller than the threshold, splitting a coding block of luma samples associated with the second coding tree node with a luma coding tree, and splitting a coding block of chroma samples associated with the second coding tree node with a chroma coding tree.

Optionally, in any of the preceding aspects, another implementation of the aspect provides, wherein the threshold is 4096 luma samples or 2048 luma samples.

Optionally, in any of the preceding aspects, another implementation of the aspect provides, wherein the common coding tree is quad-tree split.

Optionally, in any of the preceding aspects, another implementation of the aspect provides, wherein a split mode of the first coding tree node is implicated when the coding tree node has a size larger than a threshold.

Optionally, in any of the preceding aspects, another implementation of the aspect provides, wherein the size is represented by log 2CbSize, and the threshold is equal to 6.

In an embodiment, the disclosure includes a video coding device comprising a processor configured to perform any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 8 is a flowchart of an example method of partitioning a CTU with a common coding tree for CBs above a threshold size and with split sub-trees for CBs with a size equal to or less than a threshold size.

FIG. 9 is a schematic diagram of an example video coding device.

FIG. 11 is a flowchart of an example method of partitioning a CTU with a common coding tree for CBs above a threshold size and with split sub-trees for CBs with a size equal to or less than a threshold size.

DETAILED DESCRIPTION

Figure 1:
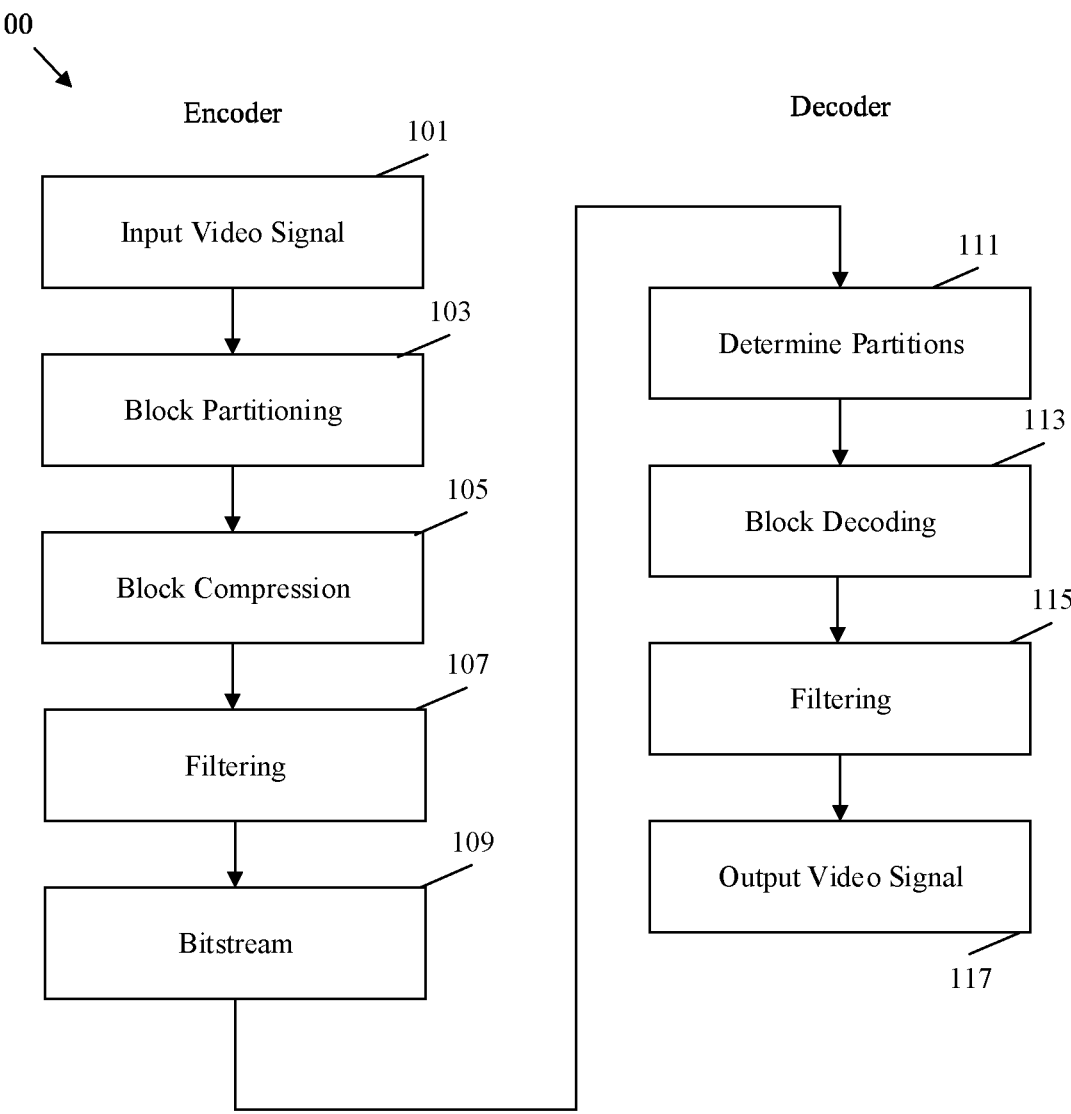
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding includes partitioning video frames into blocks and encoding the blocks via intra-prediction and inter-prediction to compress the size of a video file. The present disclosure relates to improvements in the partitioning process. A video frame is first partitioned into coding tree units (CTUs). The CTUs contain pixel data expressed as luma samples (e.g., light vs. dark values) and chroma values (e.g., color). The CTU is partitioned by one or more coding trees to create coding blocks (CBs) that can then be coded (e.g., encoded when at an encoder or decoded when at a decoder). In some systems, a single coding tree is employed for partitioning both luma and chroma samples. The problem with such a system is the luma samples in the CTU and the chroma samples in the CTU may contain significantly different patterns. As such, a coding tree that supports an efficient encoding for the luma components may result in an inefficient encoding for the chroma components, and vice versa. Hence, such a system may create compressed video files with sub-optimal coding efficiency (e.g., reduced compression and larger file size).

In an alternate system, different coding trees are used for luma samples and chroma samples. Such a system results in increased coding efficiency for the block encoding. However, determining a separate luma coding tree and chroma coding tree for each CTU substantially increases the complexity of the coding process. For example, such an approach may double the amount of processing resources employed during the partitioning portion of encoding as twice the number of coding trees are selected. Further, the selected coding trees are encoded in the bitstream as partition data. Hence, employing separate luma coding trees and chroma coding trees for each CTU may increase the amount of partition data stored in the encoding (e.g., double the number of encoded trees), which offsets some of the coding efficiency gained by the block encoding.

Disclosed herein are mechanisms to improve CTU partitioning. A common coding tree is used for coding both the luma samples and the chroma samples so long as the corresponding CBs are larger than a predefined threshold (e.g., four thousand ninety-six pixels). Luma CBs and chroma CBs that are equal to or less than the threshold size are partitioned by a luma coding sub-tree and a chroma coding sub-tree, respectively. The luma coding sub-tree and the chroma coding sub-tree can be different. Hence, the sub-trees can be selected to increase coding efficiency based on variations between the luma samples and the chroma samples. Further, the common coding tree with split luma coding sub-trees and chroma coding sub-trees employs less data than two completely separate coding trees. Hence, a coding tree with split sub-trees increases coding efficiency over separate coding trees. In addition, selecting a coding tree with split sub-trees is less complex than selecting two separate coding trees, and hence employs fewer processing resources. For example, a process of selecting a coding tree with split sub-trees may occur more quickly than a process of selecting a pair of coding trees for a CTU. The split sub-tree mechanism disclosed herein may be applied to intra-prediction (I) slices (e.g., slices of an I type) in a video frame. The split sub-tree mechanism may also be applied to prediction (P) and bi-directional prediction (B) slices (e.g., slices on a P type and B type, respectively). In one example, the split sub-tree mechanism can be inferred, and hence generally employed (e.g., on I slices). In another example, a luma_chroma_separate flag can be set in CTU related syntax in the bitstream in order to indicate whether split sub-trees are employed for the corresponding CTU. Accordingly, the split sub-tree mechanism described herein can be employed by an encoder when partitioning CTUs for encoding and by a corresponding decoder when partitioning CTUs for decoding.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artifacts. Once the frames are filtered, the video signal can be output to a display at step 117 for viewing by an end user.

The present disclosure relates to modifications to provide for increased coding efficiency (e.g., file size reduction) and/or reduced coding complexity (e.g., reduced processor resource usage) when partitioning CTUs. Hence, the present disclosure improves the functionality of block partitioning at step 103 at the encoder and determining partitions at step 111 at the encoder. Specifically, at steps 103 and 111, a common coding tree is used to partition both luma samples and chroma samples in a CTU as long as corresponding CBs are of a size that is greater than a threshold. For CBs that are equal to or smaller than the threshold, the coding tree splits into luma coding sub-tree(s) and chroma coding sub-tree(s) that can perform different partitions on sub-threshold luma CBs and chroma CBs, respectively.

Figure 2:
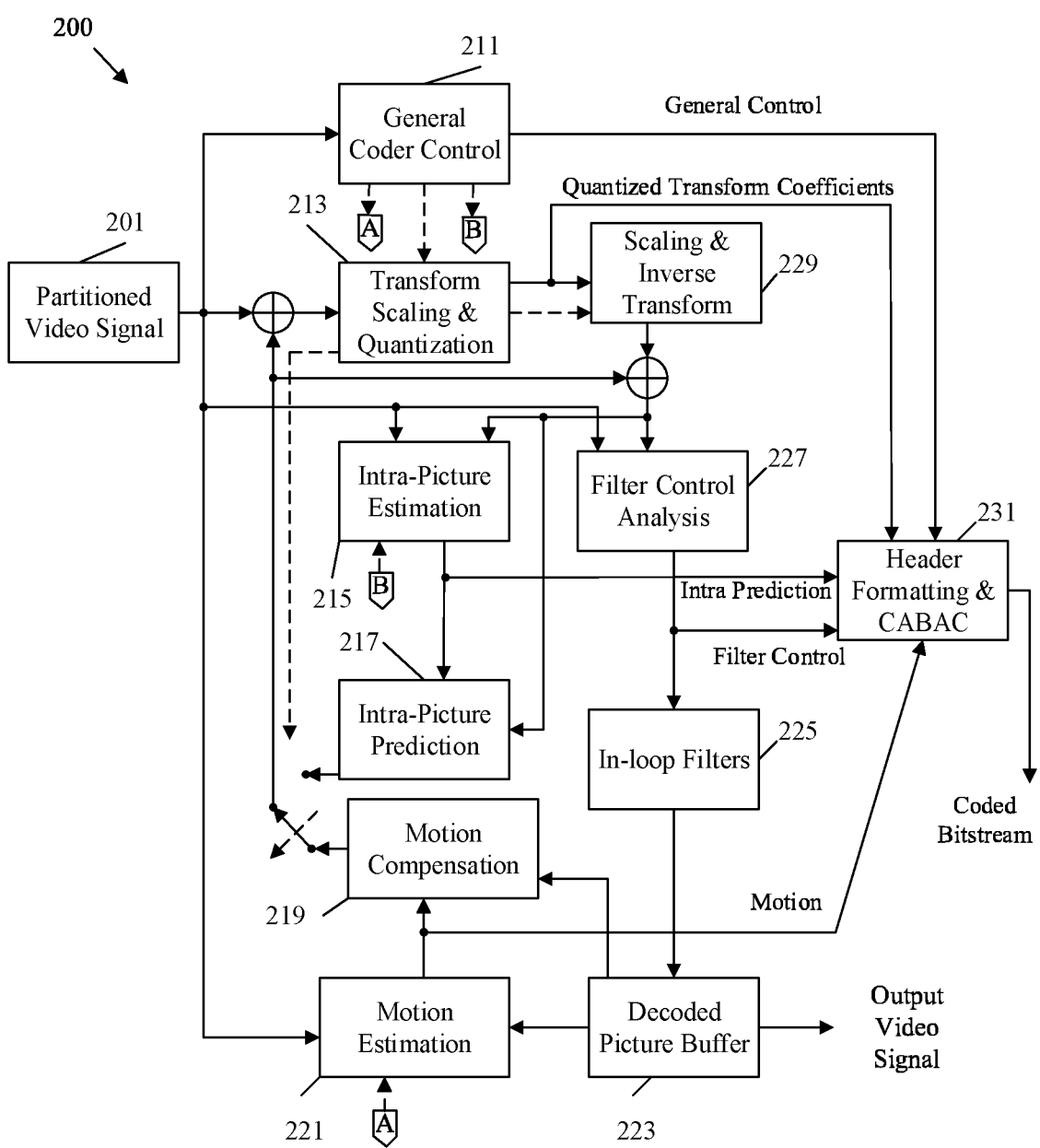
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

The present disclosure includes modifications to provide for increased coding efficiency (e.g., file size reduction) and/or reduced coding complexity (e.g., reduced processor resource usage) when partitioning CTUs. Hence, the present disclosure improves the functionality of the codec system 200 when generating the partitioned video signal 201 for encoding and/or decoding by the remainder of the codec system 200, depending on the example. Specifically, when generating the partitioned video signal 201 a common coding tree is used to partition both luma samples and chroma samples in a CTU as long as corresponding CBs are of a size that is greater than a threshold. For CBs that are equal to or smaller than the threshold, the coding tree splits into luma coding sub-tree(s) and chroma coding sub-tree(s) that can perform different partitions on sub-threshold luma CBs and chroma CBs, respectively.

Figure 3:
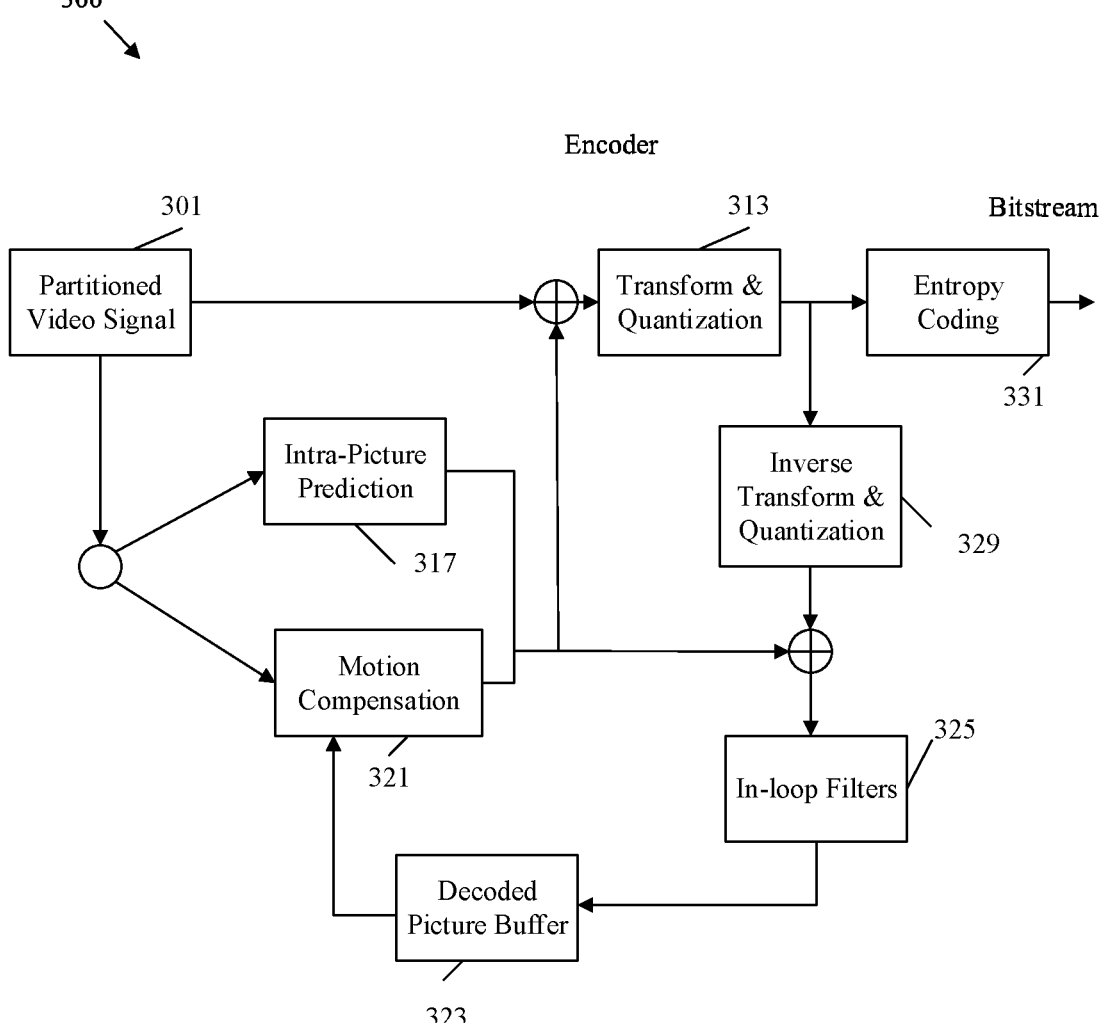
FIG. 3 is a schematic diagram illustrating an example video encoder that may partition luma and chroma blocks.

FIG. 3 is a block diagram illustrating an example video encoder 300 that may partition luma and chroma blocks. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

The video encoder 300 receives and partitions a series of video frames into a partitioned video signal 301 for further compression via other components as discussed above. The video frames are split into slices. Specifically, portions of the frame are selected for unidirectional inter-prediction by motion compensation component 321 and included in one or more P slices. Other portions of the frame are selected for bi-directional inter-prediction by motion compensation component 321 and included in one or more B slices. Still other portions of the frame are selected for intra-prediction by intra-picture prediction component 317 and included in one or more I slices. While the disclosed mechanisms are operable for P and B slices, coding efficiency is increased most significantly for I slices in many examples. Hence, the disclosed mechanisms are described primarily with reference to I slices.

The slices in a video frame are further sub-divided into CTUs. A CTU contains both luma and chroma samples. A coding tree is then selected and applied to each CTU. A CTU can be referred to as a CTB for partitioning purposes. The coding tree for a CTB applies selected split modes to divide the CTB into luma CBs. The coding tree for the CTB then applies selected split modes to divide the CTB into chroma CBs. The luma CBs and corresponding choma CBs (e.g., both Cr and Cb) are each included in a CU with corresponding syntax information. The CUs make up the partitioned video signal 301, which is forwarded to the motion compensation component 321, intra-picture prediction component 317, and/or transform and quantization component 313 for compression.

The disclosed mechanisms apply the same coding tree (also referred to herein as a common coding tree) to all of the samples in a CTU. However, the encoder system 300 employs a threshold for the application of the coding tree to the CTU. Luma coding blocks and chroma coding blocks of a size that exceeds the threshold are split by the same coding tree, and hence are split by the same split modes resulting in the same partition. The coding tree splits into a luma coding sub-tree and a chroma coding sub-tree for luma and chroma coding blocks, respectively, that are of a size equal to or smaller than the threshold. Accordingly, the final partition for the luma blocks is the same as for the chroma blocks until the threshold is reached. Then the partitions diverge, which allows the coding sub-trees to select split modes to optimize coding efficiency by taking into account the differences between the luma samples and the chroma samples. In this manner overall coding efficiency is increased over using a single coding tree for all samples in a CTU. Further, the shared coding tree is only computed once for a CTU and only stored once (e.g., in syntax in the bitstream). The sub-trees are calculated separately and stored separately (e.g., as a difference between the sub-trees). However, the increase in computational complexity and encoding size for the different sub-trees is significantly smaller than the complexity and encoding size for separate coding trees. Hence, the disclosed mechanism increases overall coding efficiency by reducing the file size of the final bitstream as well as reduces complexity and hence processor resource usage relative to other partitioning mechanisms.

Figure 4:
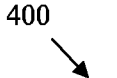
FIG. 4 is a schematic diagram illustrating an example video decoder that may partition luma and chroma blocks.

FIG. 4 is a block diagram illustrating an example video decoder 400 that may partition luma and chroma blocks. Video decoder 400 may be employed to implement the decoding functions of codec system 200 and/or implement steps 111, 113, 115, and/or 117 of operating method 100.

Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Like the video encoder 300, the video decoder 400 performs partitioning by applying a common coding tree for luma blocks and chroma blocks with sizes above a threshold, and applying split coding sub-trees for luma blocks and chroma blocks with sizes equal to or below the threshold. Specifically, the entropy decoding component 433 of the decoder 400 obtains the common coding tree, the luma coding sub-tree, and the chroma coding sub-tree from the syntax for the CTUs. For each CTU, the common coding tree is applied to divide the luma samples into luma coding blocks unit the threshold is reached. Then the luma coding sub-tree is applied to sub-divide the luma coding blocks to sizes that are equal to/smaller than the threshold. Further, the common coding tree is applied to divide the chroma samples into chroma coding blocks unit the threshold is reached. Then the chroma coding sub-tree is applied to sub-divide the chroma coding blocks to sizes that are equal to/smaller than the threshold. The same coding tree and chroma coding sub-tree can be applied to both Cr and Cb samples. The resulting coding blocks can be combined into CUs and forwarded to the motion compensation component 421, the intra-picture prediction component 417, and/or the inverse transform and quantization component 429 for decoding into a final video frame for display to a user as part of the output video signal.

Using the common coding tree and split sub-trees reduces the file size of the bitstream and hence increases coding efficiency at the decoder system 400 as in the encoder system 300. Further, complexity reduction may also be achieved as the common coding tree is applied to both the luma samples and the chroma samples until the threshold is reached, which may require fewer processing resources than applying separate coding trees. The partitioning mechanism employing the common coding tree and split sub-trees, as used in method 100, codec system 200, encoder system 300, and decoder system 400 is discussed in more detail with respect to the FIGs. below.

Figure 5:
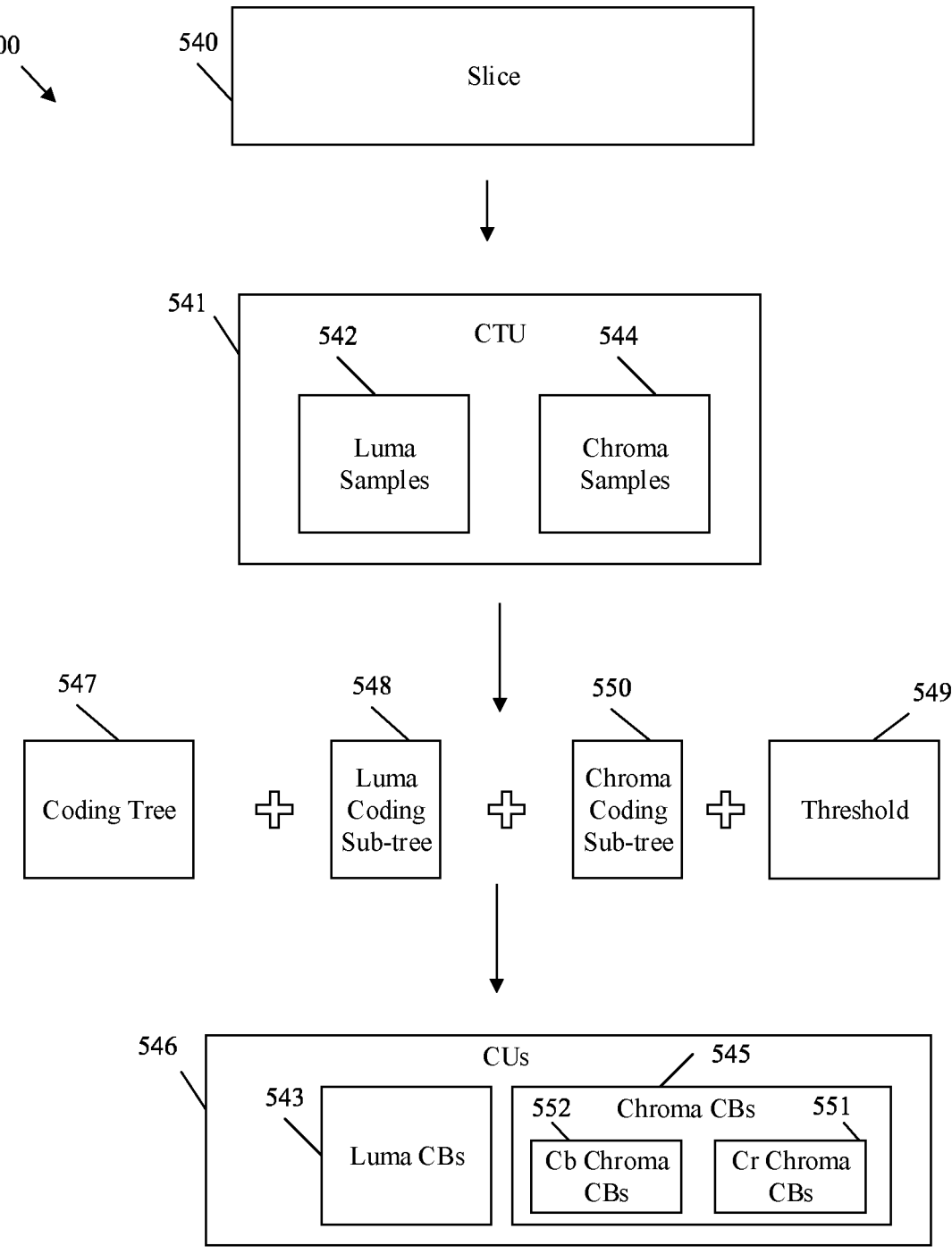
FIG. 5 is a schematic diagram illustrating an example mechanism of partitioning a coding tree unit (CTU) into coding units (CUs) containing luma coding blocks (CBs) and chroma CBs.

FIG. 5 is a schematic diagram illustrating an example mechanism 500 of partitioning a CTU into coding units (CUs) containing luma CBs and chroma CBs. Mechanism 500 may be employed by method 100, codec system 200, encoder system 300, and/or decoder system 400 when partitioning video frames.

A video frame is received and partitioned into one or more slices 540. A slice 540 is a spatially distinct region of a frame that is encoded separately from other regions in the same frame. Regions of the frame are assigned to slices 540 based on an assigned coding mechanism for the corresponding region. Regions of a frame that are designated for unidirectional inter-prediction and bidirectional inter-prediction are assigned to P and B slices 540, respectively. Regions of the frame that are designated for intra-prediction are assigned to I slices 540.

The slices 540 are divided into CTUs 541. A CTU 541 is a largest block of pixels that can accept application of a complete coding tree 547 (e.g., a coding tree 547 does not generally span across CTU 541 boundaries). A CTU 541 size is defined by syntax, and may be, for example, sixty-four pixels by sixty-four pixels, thirty-two pixels by thirty-two pixels, sixteen pixels by sixteen pixels, etc. A CTU 541 may also be a rectangle in some examples. A CTU 541 contains both luma samples 542 and chroma samples 544. A luma sample 542 is a light value and a chroma sample 544 is a color value. Chroma samples 544 may include both Cb values and Cr values. It should be noted that luma sample 542 and chroma sample 544 can also be referred to as luma data and chroma data, respectively, in some contexts.

A coding tree 547, luma coding sub-tree 548, and chroma coding sub-tree 550 are applied to the luma samples 542 and the chroma samples 544 based on the threshold 549. A coding tree 547 is a list of decision nodes related by child and/or parent relationships. Each node is associated with a split mode that partitions corresponding samples. The first node (e.g., root node) of the coding tree 547 applies a split mode to partition the luma samples 542 or chroma samples 544 into corresponding blocks. Child nodes recursively apply further split modes to subdivide corresponding portions of the blocks into smaller blocks until the branches of the coding tree 547 are reached.

As noted above, the coding tree 547 is applied to both luma samples 542 and chroma samples 544 until the corresponding blocks are divided to a size indicated by the threshold 549. The threshold 549 is a defined numerical size value. For example, the threshold 549 may be four thousand ninety-six pixels, two thousand forty-eight pixels, one thousand twenty-four pixels, etc. The threshold 549 may also be expressed as a log based value in some cases, such as log 2Cbsize, where log 2Cbsize is the log 2 multiplied by the coding block size (e.g., six pixels) which equals four thousand ninety-six pixels.

Luma coding sub-tree 548 and chroma coding sub-tree 550 are applied to coding blocks that are split to a size that is equal to or smaller than the threshold 549. Specifically, luma coding blocks 543 and chroma coding blocks 545 contain a sub-set of the luma samples 542 and chroma samples 544, respectively for the CTU 541. Accordingly, the luma coding sub-tree 548 and the chroma coding sub-tree 550 are applied to the luma coding blocks 543 and chroma coding blocks 545 to further partition the luma samples 542 and chroma samples 544, respectively, when the size of such blocks are below the threshold. A coding sub-tree is a coding tree with a root node that is a child of the coding tree 547. The coding sub-trees include a luma coding sub-tree 548 for application to the luma samples 542 and a chroma coding sub-tree 550 for application to the chroma samples 544. The luma coding sub-tree 548 and the chroma coding sub-tree 550 can be different, which allows for different sub-partitions for the luma samples 542 and the chroma samples 544 even though the larger partitions are shared by both the luma samples 542 and the chroma samples 544. Hence, luma samples 542 and chroma samples 544 are split by the same split modes according to the coding tree 547 until the threshold 549 is reached. Then luma blocks and chroma blocks, as created by the coding tree 547, are subjected to different split modes based on the different luma coding sub-tree 548 and chroma coding sub-tree 550.

The coding tree 547 and the luma coding sub-tree 548 split the luma samples 542 into luma coding blocks 543. The coding tree 547 and the chroma coding sub-tree 550 split the chroma samples 544 into chroma coding blocks 545. A luma coding block 543 is a partitioned group of luma samples 542 designated for further compression. A chroma coding block 545 is a partitioned group of chroma samples 544 designated for further compression. The luma coding block 543 and related chroma coding blocks 545 may be assigned to a coding unit 546. A coding unit 546 is a group of related pixel sample values that are forwarded for video compression via inter-prediction and/or intra-prediction. When the slice 540 is a I slice 540, the coding unit 546 is forwarded for intra-prediction. When the slice 540 is a P slice 540 or a B slice 540, the coding unit 546 is forwarded for inter-prediction. The coding unit 546 may contain a single luma coding block 543 and chroma coding blocks 545 including a Cr chroma coding block 551 with Cr sample values, and a Cb chroma coding block 552 with Cb sample values.

Figure 6:
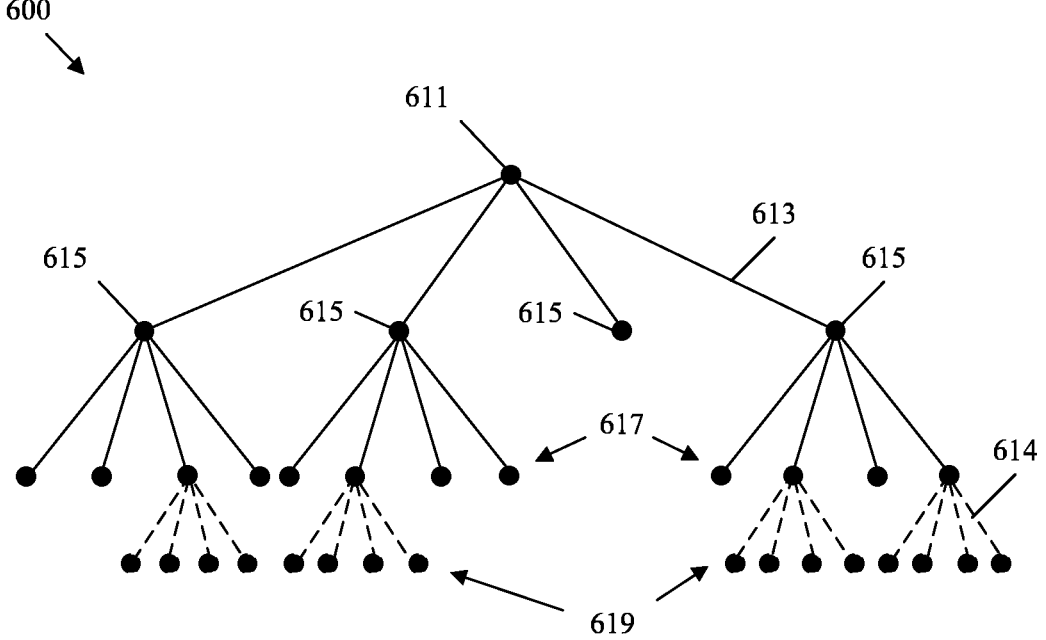
FIG. 6 illustrates an example coding tree as applied to a CTU.

FIG. 6 illustrates an example coding tree 600 as applied to a CTU, which may be substantially similar to coding tree 547 and CTU 541, respectively. Accordingly, coding tree 600 may be employed by method 100, codec system 200, encoder system 300, decoder system 400, and/or mechanism 500 when partitioning video frames. For example, a coding tree 600 may include a common coding tree 613 with luma and/or chroma coding sub-trees 614, which may implement a coding tree 547, a luma coding sub-tree 548, and/or a chroma coding sub-tree 550.

A coding tree 600 is employed to partition a CTU into CBs that make up a CU. The coding tree 600 includes a plurality of nodes, for example including a root node 611, second layer nodes 615, third layer nodes 617, and fourth layer nodes 619 in the illustrated example. It should be noted that, while four layers of nodes are depicted, any number of layers may be employed depending on the CTU size and the minimum block size. A node 611, 615, 617, and 619 is depicted in FIG. 6 as a black dot. A coding tree 600 node, as used herein, is a block of pixels of a corresponding size upon which a split mode can be applied to partition the block into a plurality of smaller blocks of pixels. In the example shown, the nodes employ a quad tree split mode that splits the corresponding block into four smaller blocks. This process can continue until a predefined condition is reached. Such predefined conditions can include a minimum block size and/or signal characteristics of the block (e.g., coefficients of the data in the block in the frequency domain). For example, at a root node 611, a split mode can be applied to partition the block, in this case the CTU, into smaller blocks. A split mode with a corresponding partition is selected to separate pixels with different values into different blocks and group pixels with similar values into common blocks. The blocks partitioned at the root node 611 result in second layer nodes 615. At each node, the block is checked for signal characteristics and block size. When the signal characteristics indicate the block contains pixels of relatively similar values, the block may not be split further. Also, when the blocks reach a minimum size, the blocks may not be split further. In the example shown, three of the second layer nodes 615 are further split by applying additional split modes with corresponding partitions resulting in third layer nodes 617. In this example, one of the second layer nodes 615 is not split further, for example because signal characteristics related to the samples in the block (e.g., coefficients in the frequency domain) indicate that the block contains pixels of relatively similar values. Likewise, the third layer nodes 617 can then be split into fourth layer nodes 619 in this example.

Accordingly, when a coding tree 600 is applied to a CTU, the coding tree 600 applies a root node 611 with a corresponding split mode to the entire CTU to partition the CTU into blocks. The coding tree 600 then applies nodes 615, 617, and/or 619 of progressively smaller sizes to recursively partition each layer of blocks into smaller blocks, subject to minimum block sizes and signal characteristic constraints. While quad tree split modes are shown in FIG. 6, many split modes can be employed as discussed below.

As noted above, the signal characteristics of luma components and chroma components may be significantly different. Accordingly, an efficient split mode for a luma block may be different than an efficient split mode for a chroma block at the same location. As such, a common coding tree 613 can be employed for nodes 611 and 615 and corresponding blocks that are larger than a threshold. Separate luma and chroma coding sub-trees 614 can be employed to split nodes and corresponding blocks that are equal to or smaller than the threshold, in this cases to split third layer nodes 617 into fourth layer nodes 619. A coding sub-tree 614 is a coding tree with a root node that is a child of the common coding tree 613. The common coding tree 613 is depicted in solid lines and the coding sub-trees 614 are depicted in dashed lines. Specifically, when a node 611 and 615 is associated with a size that is larger than the threshold, then the node 611 and 615 is positioned on the common coding tree 613. When a node 617 and 619 is equal to or smaller than the threshold, the node 617 and 619 is positioned on a coding sub-tree 614. Nodes and corresponding split modes selected for a luma coding sub-tree 614 can be replaced with different nodes and/or split modes when determining a chroma coding sub-tree 614. In this case, nodes 617 in a luma coding sub-tree can employ different split modes than nodes 617 in a chroma coding sub-tree, resulting in different nodes 619 for different coding sub-trees 614. This allows luma coding blocks and chroma coding blocks to maintain a similar overall partition while employing different small grained partitions.

Figure 7:
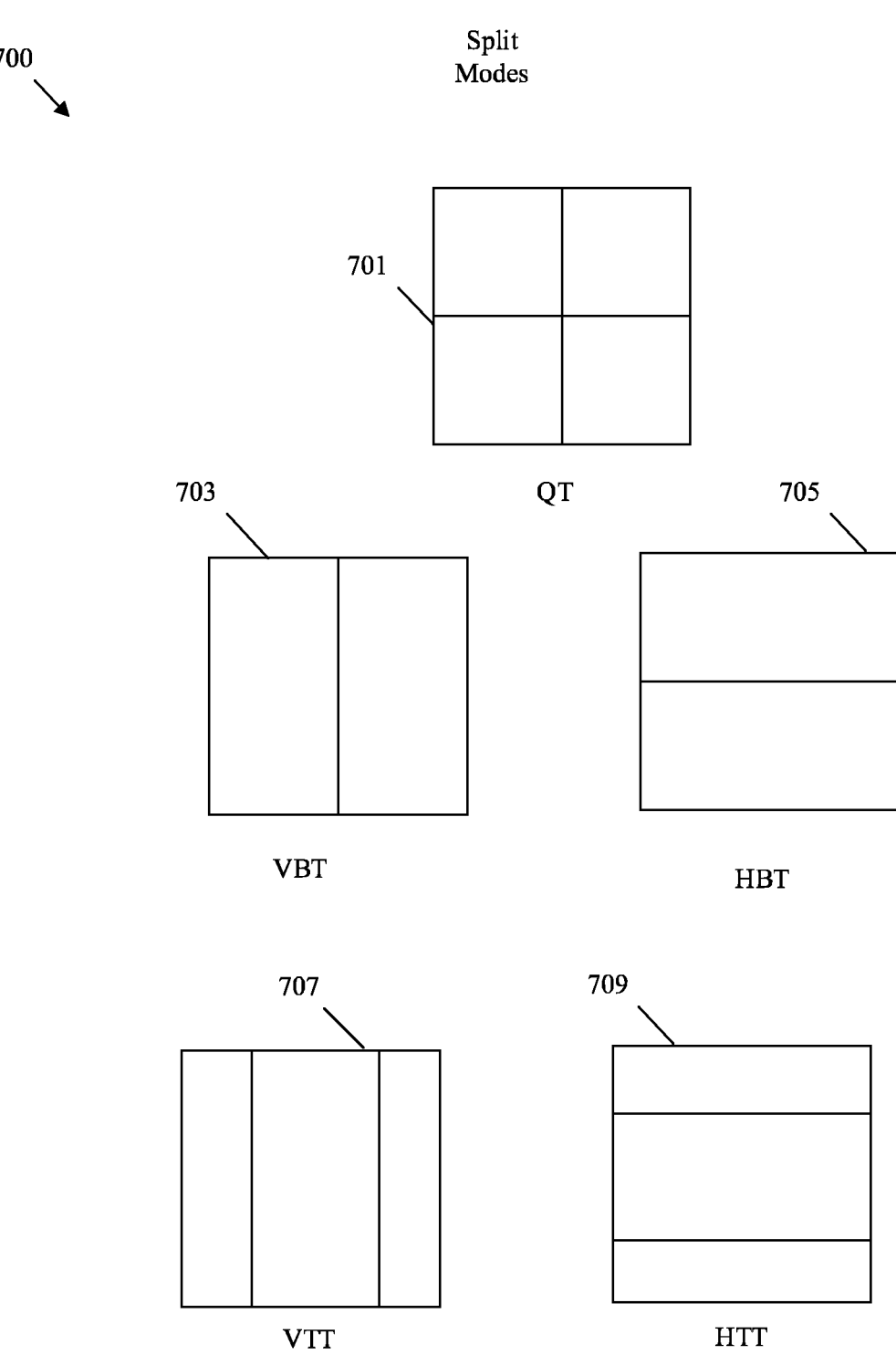
FIG. 7 is a schematic diagram illustrating an example set of split modes employed in coding trees.

FIG. 7 is a schematic diagram illustrating an example set of split modes 700 employed in coding trees, such as coding tree 547, luma coding sub-tree 548, chroma coding sub-tree 550, coding tree 600, common coding tree 613, and coding sub-tree 614. As such, the set of split modes 700 can be employed in mechanism 500 when operating method 100, codec system 200, encoder system 300, and/or decoder system 400 to partition video frames. The set of split modes 700 includes a quad tree (QT) 701, a vertical binary tree (VBT) 703, a horizontal binary tree (HBT) 705, a vertical triple tree (VTT) 707, and a horizontal triple tree (HTT) 709. Each node of a coding tree (and each node in a coding sub-tree) applies one of the set of split modes 700 to a block of samples. Hence, a parent node in a coding tree/sub-tree applies a split mode to a group of samples to create two, three, or four blocks (depending on split mode). Then child nodes apply more split modes to further divide the blocks created by the parent node. Child nodes of the child nodes can further sub-divide such blocks until the end of the coding tree/sub-tree is reached. The split mode for a particular node is selected from the set of split modes 700 (e.g., by an RDO process at an encoder) to group samples with similar values in order to support efficient compression by intra-prediction and/or inter-prediction. At a decoder, the coding tree, sub-trees, and split modes can be determined from the bitstream, for example as stored in syntax in a parameter set for the slice, CTU, and/or corresponding coding units.

A QT 701 is a split mode that splits a coding block into four equal sub-blocks. Hence, a QT 701 splits a block of luma samples into four blocks of luma samples of equal size. Further, a QT 701 splits a block of chroma samples into four smaller blocks chroma samples of equal size.

A VBT 703 is a split mode that splits a coding block into two sub-blocks of equal size. Such sub-blocks have the same as height and half the width of the original coding block. Hence, a VBT 703 splits a parent block of luma samples into two child blocks of luma samples of equal size with the same height and half the width of the parent block of luma samples. Further, a VBT 703 splits a parent block of chroma samples into two child blocks of chroma samples of equal size with the same height and half the width of the parent block of chroma samples.

A HBT 705 is a split mode that splits a coding block into two sub-blocks of equal size. Such sub-blocks have the same width and half the height of the original coding block. Hence, a HBT 705 splits a parent block of luma samples into two child blocks of luma samples of equal size with the same width and half the height as the parent block of luma samples. Further, a HBT 705 splits a parent block of chroma samples into two child blocks of chroma samples of equal size with the same width and half the height of the parent block of chroma samples.

A VTT 707 is a split mode that splits a coding block into three sub-blocks. Such sub-blocks have the same height as the original coding block. One of the sub-blocks has half of the width of the original coding block and two of the sub-blocks have a width of one quarter of the original coding block. Hence, a VTT 707 splits a parent block of luma samples into three child blocks of luma samples with the same height as the parent block of luma samples and with one quarter, one half, and one quarter of the width of the parent block of luma samples, respectively. Further, a VTT 707 splits a parent block of chroma samples into three child blocks of chroma samples with the same height as the parent block of chroma samples and with one quarter, one half, and one quarter of the width of the parent block of chroma samples, respectively.

A HTT 709 is a split mode that splits a coding block into three sub-blocks. Such sub-blocks have the same width as the original coding block. One of the sub-blocks has half of the height of the original coding block and two of the sub-blocks have a height of one quarter of the original coding block. Hence, a HTT 709 splits a parent block of luma samples into three child blocks of luma samples with the same width as the parent block of luma samples and with one quarter, one half, and one quarter of the height of the parent block of luma samples, respectively. Further, a HTT 709 splits a parent block of chroma samples into three child blocks of chroma samples with the same width as the parent block of chroma samples and with one quarter, one half, and one quarter of the height of the parent block of chroma samples, respectively.

FIG. 8 is a flowchart of an example method 800 of partitioning a CTU, such as CTU 541, with a common coding tree, such as coding tree 547 and/or 613, for coding tree nodes above a threshold size, such as threshold 549, and with split sub-trees, such as luma coding sub-tree 548, chroma coding sub-tree 550, and/or coding sub-trees 614, for coding tree nodes with a size equal to or less than the threshold size. Method 800 may be employed to implement mechanism 500 by employing the set of split modes 700. Method 800 can be employed in method 100, codec system 200, encoder system 300, and/or decoder system 400 to partition samples from video frames into coding blocks.

Optional step 801 may occur when method 800 is employed at a decoder. In some examples, partitioning by a common coding tree and split luma/chroma coding sub-trees is optional. In such examples, an encoder can encoded a luma_chroma_separate flag. The luma_chroma_separate flag can be set (e.g., to one) to indicate that separate coding sub-trees are employed for luma coding blocks and chroma coding blocks. The luma_chroma_separate flag can be unset (e.g., set to zero) to indicate that luma and chroma blocks do not use separate coding sub-trees. Accordingly, in some examples the decoder can obtain/receive the luma_chroma_separate flag from the bitstream in order to determine whether separate coding sub-trees should be used for partitioning. When the luma_chroma_separate flag indicates a split between the luma coding sub-tree and the chroma coding sub-tree, the decoder can prepare to partition the luma samples and chroma samples by different coding sub-trees based on the value of the luma_chroma_separate flag. In other examples, method 800 is applied to all CTUs in I slices. In such an example, luma samples and chroma samples are partitioned by different coding sub-trees when the coding tree unit is included in an I slice in a video frame. In such a case, step 801 may be omitted as the use of split sub-trees is implicit in such examples.

At step 803, a coding tree unit is obtained. As discussed, the coding tree unit includes both luma samples and chroma samples. When operating at an encoder, the coding tree unit is obtained from memory and/or is obtained from a slice of a video frame. When operating at a decoder, the coding tree unit is obtained from a bitstream received from an encoder.

At step 805, the luma samples and the chroma samples are partitioned according to common coding tree for coding tree nodes (e.g., a first coding tree node) with a size exceeding a threshold. Coding tree node size is the size of the current coding block being subdivided at the corresponding coding tree node. The threshold may be stored in syntax or pre-defined. For example, the threshold may be four thousand ninety-six pixels, two thousand forty-eight pixels, one thou-sand twenty-four pixels, etc. It should be noted that step 805 is split from steps 807 and 809 for clarity of discussion. In an example implementation, step 805 and step 807 are performed on luma samples and then step 805 and step 809 are performed on chroma samples. Hence, the step ordering is included for clarity of discussion and should not be considered limiting.

At step 807, luma samples associated with coding tree nodes (e.g., a second coding tree node) with a size equal to or less than the threshold are partitioned with a luma coding sub-tree. At step 809, chroma samples associated with coding tree nodes (e.g., a third coding tree node) with a size equal to or less than the threshold are partitioned with a chroma coding sub-tree. The luma coding sub-tree of step 807 contains a different partitioning than the chroma coding sub-tree of step 809. Hence, the overall partitions (e.g., larger/parent partitions) for the luma blocks and chroma blocks are similar due to using the common coding tree at step 805. However, the smaller/child partitions for the luma coding blocks and the chroma blocks can be different and the chroma blocks can be tailored to differences in the luma and encoded into a bitstream. The coding tree, luma coding sub-tree, and chroma coding sub-trees are also encoded into the bitstream. For example, the common coding tree can be coded in the bitstream as TREE_L_C, the luma coding sub-tree can be coded in the bitstream as TREE_L, and the chroma coding sub-tree can be coded in the bitstream as TREE_C. The bitstream is then transmitted toward a decoder to support reconstruction of the chroma coding blocks and the luma coding blocks for display at a video decoder.

Further, in examples where separate luma coding sub-trees and chroma coding sub-trees are selected at the encod-er's discretion, the encoder can encode a luma_chro-ma_separate flag into the bitstream (as syntax) to indicate a split between the luma coding sub-tree and the chroma coding sub-tree to the decoder at step 811. In cases where split sub-trees are used for all CTUs from I slices, the luma_chroma_separate flag can be omitted.

When method 800 is employed at a decoder, the decoder reconstructs the luma blocks and chroma blocks (e.g., via intra-prediction of inter-prediction) at step 811. The decoded blocks can then be arranged into a slice of a video frame based on the common coding tree, the luma coding sub-tree, and the chroma coding sub-tree. The slice can be arranged into the video frame, which can then be included in a video sequence. The video frame/video sequence is then for-warded toward a display for display to an end user.

Table 1 below is an example of syntax that implements method 800 when use of split coding sub-trees is implicit for I slice CTUs.

TABLE 1

| | Descriptor |
|---|---|
| coding_tree_unit( ) { | |
|     xCtb = ( CtbAddrInRs % PicWidthInCtbsY ) << CtbLog2SizeY | |
|     yCtb = ( CtbAddrInRs / PicWidthInCtbsY ) << CtbLog2SizeY | |
|     if( slice_type = = I && qtbtt_dual_tree_intra_flag ) { | |
|         dual_tree_implicit_qt_split ( xCtb, yCtb, CtbLog2SizeY, 0) | |
|     else | |
|         coding_quadtree( xCtb, yCtb, CtbLog2SizeY, 0, SINGLE TREE ) | |
| } | |
| dual_tree_implicit_qt_split( x0, y0, log2CbSize, cqtDepth ) { | |
|     if( log2CbSize >6) { | |
|         x1 = x0 + ( 1 << ( log2CbSize − 1 ) ) | |
|         y1 = y0 + ( 1 << ( log2CbSize − 1 ) ) | |
|         dual_tree_implicit_qt_split( x0, y0, log2CbSize − 1, cqtDepth +1) | |
|         if( x1 < pic_width_in_luma_samples ) | |
|           dual_tree_implicit_qt_split( x1, y0, log2CbSize − 1, cqtDepth +1) | |
|         if( y1 < pic_height_in luma_samples ) | |
|           dual_tree_implicit_qt_split( x0, y1, log2CbSize − 1, cqtDepth +1) | |
|         if( x1 < pic_width_in_luma_samples && y1 < pic_height_in luma_samples ) | |
|           dual_tree_implicit_qt_split( x1, y1, log2CbSize − 1, cqtDepth +1) | |
|     } else { | |
|         coding quadtree( x0, y0, log2CbSize, cqtDepth, DUAL_TREE_LUMA ) | |
|         coding quadtree( x0, y0, log2CbSize, cqtDepth, DUAL_TREE_CHROMA ) | |
|     } | |
| } | | signal and the chroma signal for increased coding efficiency. This is due to the differences between the luma coding sub-tree of step 807 and the chroma coding sub-tree of step 809. It should be noted that the chroma samples may include both Cb samples and Cr samples. The Cb samples and the Cr samples are partitioned by a common chroma coding sub-tree at step 809.

Optional step 811 can be employed at an encoder or a decoder. When method 800 operates on an encoder, the luma coding blocks and chroma coding blocks resulting from the partitioning are compressed, for example as coding units, Coding_tree_unit indicates that the remaining code is specific to a coding tree unit. When the type of slice (type slice) is an I slice and the qtbtt_dual_tree_intra flag is set, the coding tree unit implicitly uses split coding trees as indi-cated by a dual_tree_implicit_qt_split function. The qtbtt_dual_tree_intra flag is set to specify that for I slices, each CTU is split into coding units with sixty-four by sixty-four luma samples using an implicit quadtree split and that these coding units are the root of two separate cod-ing_quadtree syntax structures for luma and chroma. The dual_tree_implicit_qt_split function uses a function to create a common luma/chroma coding tree (denoted as TREE_L_C status) when log 2Cbsize is greater than six (e.g., four thousand ninety-six pixels). Specifically, a coding block X is split into child coding blocks. The coding block X is split based on the location of a top left sample (x0, y0) and a bottom right sample (x1,y1) positioned based on the size of the coding block X, denoted as log 2CbSize. The child coding blocks may be of a size log 2CbSize−1, which is half of the size of the coding block X. This is because the coding block size is expressed in log 2, and hence log 2CbSize−1 is half the size of log 2CbSize. The dual_tree_implicit_qt_split function is a recursive function that can be called one to four times, depending on condition checks, resulting in one to four child coding blocks. The dual tree_implicit_qt_split function is first called based on the size of the child block log 2CbSize−1 and the top left sample (x0, y0) to create a top left child coding block. If the horizontal position of the bottom right sample x1 is within the picture, as denoted by pic_width in luma samples, then the dual_tree_implicit_qt_split function is called based on the size of the child block log 2CbSize−1 and the top right sample (x1, y0) to create a top right child coding block. If the vertical position of the bottom left sample y1 is within the picture, as denoted by pic_height_in_luma_samples, then the dual_tree_implicit_qt_split function is called based on the size of the child block log 2CbSize−1 and the bottom left sample (x0, y1) to create a bottom left child coding block. If the horizontal position of the bottom right sample x1 and the vertical position of the bottom left sample y1 are within the picture, as denoted by pic_width_in_luma_samples and pic_height_in_luma_samples, then the dual_tree_implicit_qt_split function is called based on the size of the child block log 2CbSize−1 and the bottom right sample (x1, y1) to create a bottom right child coding block. For example, when the bottom right sample (x1, y1) is selected outside of the picture due to the position of coding block X near the right border or bottom border of the picture, then fewer than four child coding blocks are created (e.g., two child coding blocks). Otherwise, four child coding blocks are created. The dual_tree_implicit_qt_split function keeps track of the current depth of the coding tree by incrementing a quad-tree depth (cqtDepth) for each child coding block created based on the cqtDepth of the parent coding block.

When log 2Cbsize (the size of coding block X) is not greater than six (e.g., else), a luma coding sub-tree (DUAL_TREE_LUMA) is used for luma blocks and a chroma coding sub-tree (DUAL_TREE_CHROMA) is used for chroma blocks. Specifically, a coding_quadtree function is called, which splits the coding block X based on the top left sample (x0, y0), the coding block size log 2CbSize and the corresponding luma coding sub-tree or chroma coding sub-tree, DUAL_TREE_LUMA or DUAL_TREE_CHROMA, respectively. The coding_quadtree function also keeps track of coding block depth with the cqtDepth value as discussed above.

Table 2 below is an example of syntax that implements method 800 when use of split coding sub-trees is discretionary for the encoder.

TABLE 2

| | Descriptor |
|---|---|
| coding_tree_node( x, y ,w , h, tree_status) { | |
|   if(tree_status = = TREE_L_C && w * h <= T) | |
|     luma_chroma_separate | ae(v) |
|   if(!luma_chroma_separate)) { | |
|     split_mode | ae(v) |
|     if(split_mode = = NO_SPLIT) | |
|       coding_unit( x, y, w, h, tree_status ) | |
|     else { | |
|       derive_child_node(split_mode, N, x_c, y_c, w_c, h_c) | |
|       for(i=0; i<N; i++ | |
|         coding_tree_node(x_c[i], y_c[i], w_c[i], h_c[i], tree_status) | |
|     } | |
|   }else { | |
|     split_mode | ae(v) |
|     split_mode_2nd | ae(v) |
|     if(split_mode = = NO_SPLIT) | |
|       coding_unit( x, y, w, h, TREE_L) | |
|     else { | |
|       derive_child_node(split_mode, N, x_c, y_c, w_c, h_c) | |
|       for(i=0; i<N; i++ | |
|         coding_tree_node(x_c[i], y_c[i], w_c[i], h_c[i], TREE_L) | |
|     } | |
|     if(split_mode_2nd = = NO_SPLIT) | |
|       coding_unit( x, y, w, h, TREE_C ) | |
|     else { | |
|       derive_child_node(split_mode_2nd, N, x_c, y_c, w_c, h_c) | |
|       for(i=0; i<N; i++) | |
|         coding_tree_node(x_c[i], y_c[i], w_c[i], h_c[i], TREES) | |
|     } | |
|   } | |
| } | |

In Table 2, coding_tree_node(x, y, w, h, tree_status) is a syntax structure that describes the partitioning information of a current node, where x and y are the coordinate of the top-left corner of the current node, respectively, w and h are the width and height of the current node, respectively, and tree_status is the tree status of the current node. Note that w and h can also be replaced by log 2(w) and log 2(h) as another example. Similarly, coding_unit(x, y, w, h, tree_s-tatus) is a syntax structure that describes a coding unit information, such as prediction information, transform infor-mation, and so on. In the right column, ae(v) indicates the syntax element is coded by Context-Adaptive Binary Arith-metic Coding (CABAC).

When the tree_status of the current node is TREE_L_C and the node is larger than the threshold T, the node uses TREE_L_C status. In this case, the luma_chroma_separate flag is not presented in the bit stream and its value is derived as zero. When the tree_status of the current node is TREE_L_C and the node is larger than the threshold T, the luma_chroma_separate flag is signaled in bit stream. When the tree_status is not TREE_L_C, the luma_chro-ma_separate flag is derived as zero.

When luma_chroma_separate is zero, only one split mode is parsed (as indicated by the syntax element split_mode). According to the split mode, the node is determined as a CU or is divided into N child nodes, where the derive_child_node (split_mode, N, x_c, y_c, w_c, h_c) denotes the processing of deriving the coordinate, width, and height of the N child nodes based on the split mode. The child nodes inherit the tree status of the current node.

When luma_chroma_separate is one, the partitioning for the luma block and chroma blocks in the current node is decoupled, and two split modes are parsed (as indicated by the syntax element split_mode and split_mode_2nd). One split mode is used for partitioning the luma block, and the other is used to partition the two chroma blocks. The tree status of the child nodes of the luma block are modified to TREE_L while the tree status of the child nodes of the chroma blocks are modified to TREE_C. The tree status is also passed to the coding unit to indicate whether a luma block and/or two chroma blocks are contained in the coding unit.

FIG. 9 is a schematic diagram of an example video coding device 900. The video coding device 900 is suitable for implementing the disclosed examples/embodiments as described herein. The video coding device 900 comprises downstream ports 920, upstream ports 950, and/or trans-ceiver units (Tx/Rx) 910, including transmitters and/or receivers for communicating data upstream and/or down-stream over a network. The video coding device 900 also includes a processor 930 including a logic unit and/or central processing unit (CPU) to process the data and a memory 932 for storing the data. The video coding device 900 may also comprise optical-to-electrical (OE) components, electrical-to-optical (EO) components, and/or wireless communication components coupled to the upstream ports 950 and/or down-stream ports 920 for communication of data via optical or wireless communication networks. The video coding device 900 may also include input and/or output (I/O) devices 960 for communicating data to and from a user. The I/O devices 960 may include output devices such as a display for displaying video data, speakers for outputting audio data, etc. The I/O devices 960 may also include input devices, such as a keyboard, mouse, trackball, etc., and/or corre-sponding interfaces for interacting with such output devices.

The processor 930 is implemented by hardware and software. The processor 930 may be implemented as one or more CPU chips, cores (e.g., as a multi-core processor), field-programmable gate arrays (FPGAs), application spe-cific integrated circuits (ASICs), and digital signal proces-sors (DSPs). The processor 930 is in communication with the downstream ports 920, Tx/Rx 910, upstream ports 950, and memory 932. The processor 930 comprises a coding module 914. The coding module 914 implements the dis-closed embodiments described above, such as methods 100 and 800 and mechanism 500, which employ a coding tree 600, a set of split modes 700, and/or any other method/mechanism described herein. Further, the coding module 914 may implement a codec system 200, an encoder 300, and/or a decoder 400. For example, the coding module 914 can be employed to partition a coding tree unit. Specifically, the coding module 914 can apply a common coding tree to luma samples and chroma samples in blocks that are larger than a threshold. The coding module 914 can also apply different luma coding sub-trees and chroma coding sub-trees to luma blocks and chroma blocks, respectively, that are equal to or smaller in size than the threshold. Hence, coding module 914 causes the video coding device 900 to operate with greater coding efficiency and/or partition coding tree units using fewer processing resources. As such, coding module 914 improves the functionality of the video coding device 900 as well as addresses problems that are specific to the video coding arts. Further, coding module 914 effects a transformation of the video coding device 900 to a different state. Alternatively, the coding module 914 can be imple-mented as instructions stored in the memory 932 and executed by the processor 930 (e.g., as a computer program product stored on a non-transitory medium).

The memory 932 comprises one or more memory types such as disks, tape drives, solid-state drives, read only memory (ROM), random access memory (RAM), flash memory, ternary content-addressable memory (TCAM), static random-access memory (SRAM), etc. The memory 932 may be used as an over-flow data storage device, to store programs when such programs are selected for execution, and to store instructions and data that are read during program execution.

Figure 10:
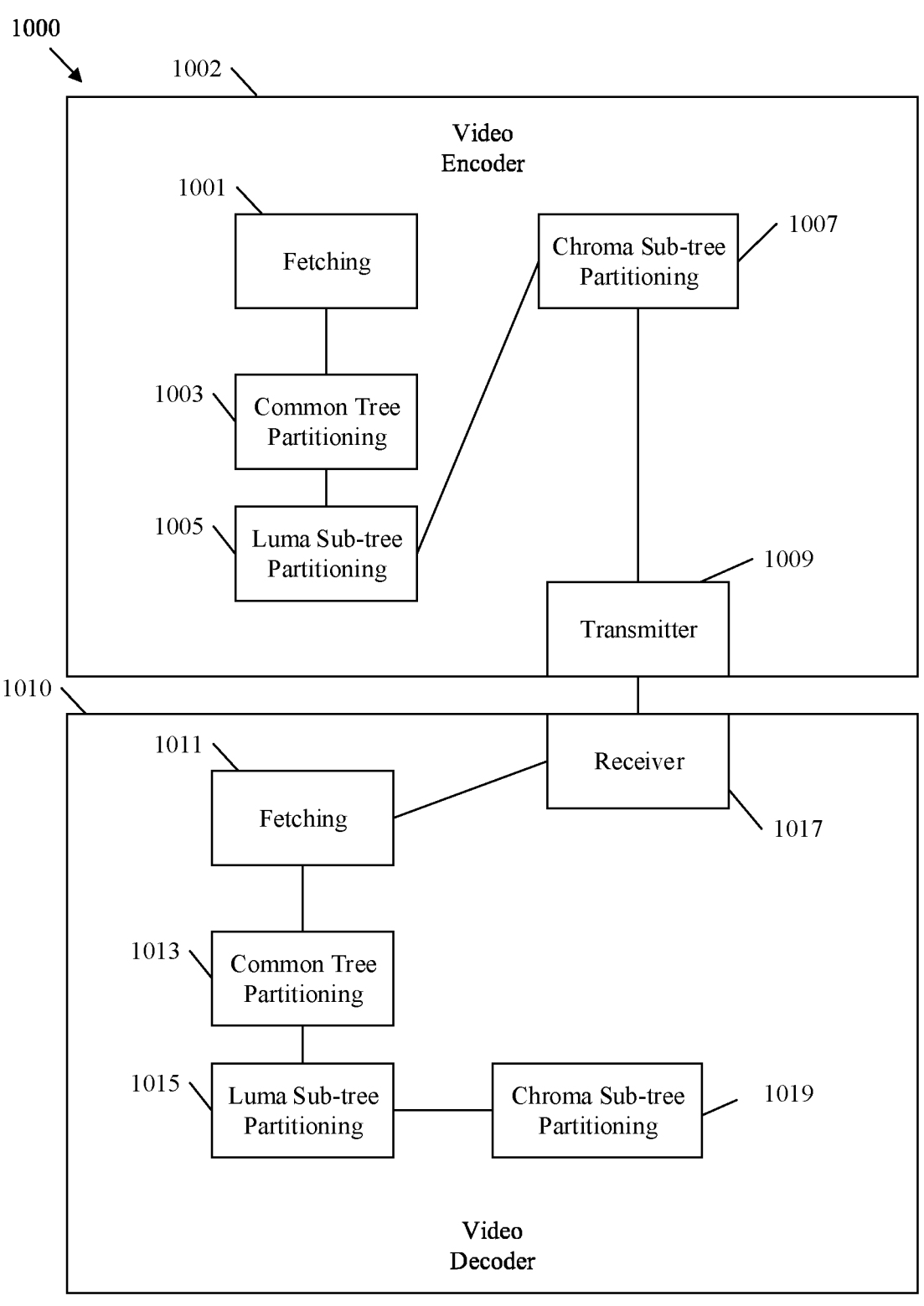
FIG. 10 is a schematic diagram of an example system for partitioning a CTU with a common coding tree for CBs above a threshold size and with split sub-trees for CBs with a size equal to or less than a threshold size.

FIG. 10 is a schematic diagram of an example system 1000 for partitioning a CTU with a common coding tree for coding blocks above a threshold size and with split sub-trees for coding blocks with a size equal to or less than a threshold size. The system 1000 includes a video encoder 1002 and a video decoder 1010, which can implement operating method 100, mechanism 500, method 800, codec system 200, encoder 300, decoder 400, and/or video coding device 900. Further, the video encoder 1002 and video decoder 1010 can perform partitioning with coding trees 613 and coding sub-trees 614 by employing the set of split modes 700.

The video encoder 1002 includes a fetching module 1001 for obtaining a coding tree unit including a coding tree node. The video coding device also comprises a common tree partitioning module 1003 for partitioning luma samples and chroma samples with a common coding tree when a first coding tree node exceeds a threshold. The video coding device also comprises a luma coding sub-tree partitioning module 1005 for partitioning the luma samples in a second coding tree node of the coding tree unit with a luma coding sub-tree when a size of the second coding tree node is equal to or less than the threshold. The video coding device also comprises a chroma coding sub-tree partitioning module 1007 for partitioning the chroma samples in the second coding tree node of the coding tree unit with a chroma coding sub-tree when the size of a second coding tree node is equal to or less than the threshold. As noted above, the luma coding sub-tree can contain a different partitioning, and hence different split modes than the chroma coding sub-tree. The chroma samples and the luma samples are encoded into a bitstream based on the common coding tree, the luma coding sub-tree, and the chroma coding sub-tree. The video encoder 1002 also includes a transmitter 1009 for transmitting the bitstream to support reconstruction of the chroma samples and the luma samples for display at a video decoder 1010.

The video decoder 1010 includes a receiver 1017 for receiving the bitstream including a coding tree unit including luma data and chroma data. The video decoder 1010 also includes a fetching module 1011 for obtaining a coding tree unit including a coding tree node. The video decoder 1010 also includes a common tree partitioning module 1013 for partitioning luma data and chroma data with a common coding tree when a first coding tree node exceeds a threshold. The video decoder 1010 also includes a luma sub-tree partitioning module 1015 for partitioning the luma data in a second coding tree node of the coding tree unit with a luma coding sub-tree when a size of the second coding tree node is equal to or less than the threshold. The video decoder 1010 also includes a chroma sub-tree partitioning module 1019 for partitioning the chroma data in the second coding tree node of the coding tree unit with a chroma coding sub-tree when the size of a second coding tree node is equal to or less than the threshold. As noted above, the luma coding sub-tree contains a different partitioning, and hence a different split modes, than the chroma coding sub-tree. The video decoder 1010 can then reconstruct the chroma data and the luma data into a slice of a video frame based on the common coding tree, the luma coding sub-tree, and the chroma coding sub-tree. The video decoder 1010 can also forward the video frame toward a display.

FIG. 11 is a flowchart of an example method 1100 of partitioning a CTU such as CTU 541, with a common coding tree, such as coding tree 547 and/or 613, for CBs above a coding sub-tree for split modes to be applied to partition a coding tree unit including luma samples and chroma samples into luma blocks and chroma blocks, respectively. Method 1100 may then be applied if/when the coding tree unit is contained in an I slice of a video frame.

At step 1103, unit when a first coding tree node of the coding tree has a size larger than a threshold the coding blocks of luma samples and the coding blocks of chroma samples associated with the first coding tree node are split by a common coding tree. For example, the threshold may be four thousand ninety-six luma samples or two thousand forty-eight luma samples. The split mode may be a quad-tree split when the coding tree node has a size larger than the threshold. In some examples, the split mode can be implicitly signaled when the coding tree node has a size larger than the threshold.

At step 1107, when a second coding tree node of the coding tree has a size equal to or smaller than the threshold, coding blocks of luma samples of the coding tree unit and associated with the second coding tree node can be split according to a luma coding tree. A luma coding sub-tree may also be referred to as a luma coding tree in some contexts. Further, when the second coding tree node of the coding tree has a size equal to or smaller than the threshold, coding blocks of chroma samples of the coding tree unit and associated with the second coding tree node can be split according to a chroma coding tree. It should be noted that for YUV4:2:0 data, a sixty-four by sixty-four luma coding block corresponds to a thirty-two by thirty-two Cb chroma coding block and a thirty-two by thirty-two Cr chroma coding block. However, when denoting the size of a coding tree node, the coding tree node may be measured using luma samples. For example, the coding tree node containing only two thirty-two by thirty-two chroma blocks may be measured as a size sixty-four by sixty-four coding tree node.

Method 1100 can be implemented according to the following syntax:

```
dual_tree_implicit_qt_split( x0, y0, log2CbSize, cqtDepth ) {
    if( log2CbSize > 6 ) {
        x1 = x0 + ( 1 << ( log2CbSize − 1 ) )
        y1 = y0 + ( 1 << ( log2CbSize − 1 ) )
        dual_tree_implicit_qt_split( x0, y0, log2CbSize − 1, cqtDepth + 1 )
            if( x1 < pic_width_in_luma_samples )
                dual_tree_implicit_qt_split( x1, y0, log2CbSize − 1, cqtDepth + 1 )
            if( y1 < pic_height_in_luma_samples )
                dual_tree_implicit_qt_split( x0, y1, log2CbSize − 1, cqtDepth + 1 )
            if( x1 < pic_width_in_luma_samples && y1 <
pic_height_in_luma_samples )
                dual_tree_implicit_qt_split( x1, y1, log2CbSize − 1, cqtDepth + 1 )
    } else {
        coding_quadtree( x0, y0, log2CbSize, cqtDepth, DUAL_TREE_LUMA )
        coding_quadtree( x0, y0, log2CbSize, cqtDepth, DUAL_TREE_CHROMA )
    }
}
``` threshold size, such as threshold 549, and with split sub-trees, such as luma coding sub-tree 548, chroma coding sub-tree 550, and/or coding sub-trees 614, for CBs with a size equal to or less than a threshold size. Method 1100 may be employed to implement mechanism 500 by employing the set of split modes 700. Method 1100 can be employed in method 100, codec system 200, encoder system 300, and/or decoder system 400 to partition samples from video frames into coding blocks.

Method 1100 includes determining that a coding tree unit is in an I slice at step 1101. For example, a decoder can parse a coding tree, a luma coding sub-tree, and/or a chroma Where the threshold is represented by log 2CbSize>6, DUAL_TREE_LUMA indicates the luma coding tree, and DUAL_TREE_CHROMA indicates the chroma coding tree.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a video coding device, the method comprising:

obtaining a coding tree unit;

determining whether the coding tree unit is in an Intra-prediction (I) slice of a video frame and whether a partition flag has a value of one, wherein the partition flag having the value of one specifies that for I slices, each coding tree unit is split using an implicit quadtree split and that these coding tree units are a root of two separate coding quadtree syntax structures for luma and chroma; and when determining the coding tree unit is in the I slice and the partition flag has the value of one:

partitioning both luma samples and chroma samples in a first coding tree block of the coding tree unit according to a same coding tree when a size of the first coding tree block is greater than a threshold, wherein the threshold is a coding block size;

partitioning the luma samples in a second coding tree block of the coding tree unit with a luma coding tree when a size of the second coding tree block is not greater than the threshold; and partitioning the chroma samples in the second coding tree block of the coding tree unit with a chroma coding tree when the size of the second coding tree block is not greater than the threshold.

2. The method of claim 1, wherein the chroma samples include blue difference chroma (Cb) samples and red difference chroma (Cr) samples, and wherein the Cb samples and Cr samples are partitioned by a dual chroma tree.

3. The method of claim 1, wherein the video coding device is an encoder, and wherein the method further comprises encoding in a bitstream the partition flag to indicate a split between the luma coding tree and the chroma coding tree.

4. The method of claim 1, wherein the video coding device is a decoder, and wherein the method further comprises receiving the partition flag from a bitstream, the partition flag indicating a split between the luma coding tree and the chroma coding tree, and wherein the luma samples and the chroma samples are partitioned by separate coding trees based on the value of the partition flag.

5. The method of claim 1, wherein the coding block size comprises 64 samples.

6. A video encoder, comprising:

one or more processors configured to:

obtain a coding tree unit;

determine whether the coding tree unit is in an Intra-prediction (I) slice of a video frame and whether a partition flag has a value of one, wherein the partition flag having the value of one specifies that for I slices, each coding tree unit is split using an implicit quadtree split and that these coding tree units are a root of two separate coding quadtree syntax structures for luma and chroma; and when determining the coding tree unit is in the I slice and the partition flag has the value of one:

partition both luma samples and chroma samples in a first coding tree block of the coding tree unit according to a same coding tree when a size of the first coding tree block is greater than a threshold, wherein the threshold is a coding block size;

partition the luma samples in a second coding tree node of the coding tree unit with a luma coding tree when a size of a second coding tree block is not greater than the threshold;

partition the chroma samples in the second coding tree block of the coding tree unit with a chroma coding tree when the size of the second coding tree block is not greater than the threshold; and encode the chroma samples and the luma samples into a bitstream based on the partition; and a transmitter coupled to the one or more processors, the transmitter configured to transmit the bitstream to support reconstruction of the chroma samples and the luma samples for display by a video decoder.

7. The video encoder of claim 6, wherein the chroma samples include blue difference chroma (Cb) samples and red difference chroma (Cr) samples, and wherein the Cb samples and Cr samples are partitioned by a dual chroma coding tree.

8. The video encoder of claim 6, wherein the one or more processors are further configured to encode the partition flag in the bitstream, the partition flag indicating a split between the luma coding tree and the chroma coding tree, and wherein the luma samples and the chroma samples are partitioned by separate coding trees based on the value of the partition flag.

9. A video decoder, comprising:

a receiver to receive a bitstream including a coding tree unit including luma data and chroma data; and one or more processors coupled to the receiver, the one or more processors configured to:

determine whether the coding tree unit is in an Intra-prediction (I) slice of a video frame and whether a partition flag has a value of one, wherein the partition flag having the value of one specifies that for I slices, each coding tree unit is split using an implicit quadtree split and that these coding tree units are a root of two separate coding quadtree syntax structures for luma and chroma; and when determining the coding tree unit is in the I slice and the partition flag has the value of one:

partition both the luma data and the chroma data with a same coding tree when a size of a first coding tree block is greater than a threshold, wherein the threshold is a coding block size;

partition the luma data with a luma coding tree when a size of a second coding tree block is not greater than the threshold;

partition the chroma data with a chroma coding tree when a size of a third coding tree block is not greater than the threshold, wherein the luma coding tree contains a different set of split modes than the chroma coding tree; and reconstruct the chroma data and the luma data for display.

10. The video decoder of claim 9, wherein the chroma data includes blue difference chroma (Cb) data and red difference chroma (Cr) data, and wherein the Cb data and Cr data are partitioned by a dual chroma coding tree.

11. The video decoder of claim 9, wherein the one or more processors are further configured to obtain the partition flag from the bitstream, the partition flag indicating a split between the luma coding tree and the chroma coding tree, and wherein the luma data and the chroma data are partitioned by different coding trees based on the value of the partition flag.

12. A method, comprising:

determining whether a coding tree unit is in an intra-prediction (I) slice of a video frame and whether a partition flag has a value of one, wherein the partition flag having the value of one specifies that for I slices, each coding tree unit is split using an implicit quadtree split and that these coding tree units are a root of two separate coding quadtree syntax structures for luma and chroma; and when determining the coding tree unit is in the I slice and the partition flag has the value of one:

when a first coding tree block of a coding tree corresponding to the coding tree unit has a size greater than a threshold, wherein the threshold is a coding block size, splitting both a coding block of luma samples and a coding block of chroma samples associated with the first coding tree block with a same coding tree; and when a second coding tree block of the coding tree has a size not greater than the threshold, splitting a coding block of luma samples associated with the second coding tree block with a luma coding tree, and splitting a coding block of chroma samples associated with the second coding tree block with a chroma coding tree.

13. The method of claim 12, wherein the chroma samples include blue difference chroma (Cb) samples and red difference chroma (Cr) samples, and wherein the Cb samples and Cr samples are partitioned by a dual chroma coding tree.

14. The method of claim 12, wherein the same coding tree is designated as dual_tree_implicit_qt_split.

15. The method of claim 12, wherein a split mode of the first coding tree block is implicated when the first coding tree block has a size greater than the threshold.

16. A video coding device, comprising:

a memory storing instructions; and one or more processors configured to execute the instructions to cause the video coding device to:

determine whether a coding tree unit is in an intra-prediction (I) slice of a video frame and whether a partition flag has a value of one, wherein the partition flag having the value of one specifies that for I slices, each coding tree unit is split using an implicit quadtree split and that these coding tree units are a root of two separate coding quadtree syntax structures for luma and chroma; and when determining the coding tree unit is in the I slice and the partition flag has the value of one:

when a first coding tree block of a coding tree corresponding to the coding tree unit has a size greater than a threshold, wherein the threshold is a coding block size, split both a coding block of luma samples and a coding block of chroma samples associated with the first coding tree block with a same coding tree; and when a second coding tree block of the coding tree has a size not greater than the threshold, split a coding block of luma samples associated with the second coding tree block with a luma coding tree, and splitting a coding block of chroma samples associated with the second coding tree block with a chroma coding tree.

17. The video coding device of claim 16, wherein the same coding tree is designated as dual_tree_implicit_qt_split.

18. The video coding device of claim 16, wherein a split mode of the first coding tree block is implicated when the first coding tree block has a size greater than the threshold.

19. A non-transitory computer-readable medium storing instructions that, when executed by one or more processors, cause the one or more processors to:

generate a bitstream comprising luma samples and chroma samples in a first coding tree block of a coding tree unit, determine whether the coding tree unit is in an Intra-prediction (I) slice of a video frame and whether a partition flag has a value of one, wherein the partition flag having the value of one specifies that for I slices, each coding tree unit is split using an implicit quadtree split and that these coding tree units are a root of two separate coding quadtree syntax structures for luma and chroma; and when determining the coding tree unit is in the I slice and the partition flag has the value of one:

wherein both the luma samples and the chroma samples are partitioned with a same coding tree when a size of the first coding tree block is greater than a threshold, wherein the threshold is a coding block size, wherein the luma samples are partitioned with a luma coding tree when a size of a second coding tree block is not greater than the threshold, and wherein the chroma samples are partitioned with a chroma coding tree when the size of the second coding tree block is not greater than the threshold.

* * * * *